(12) United States Patent  
Kajihata

(10) Patent No.: US 7,715,647 B2
(45) Date of Patent: May 11, 2010

(54) DATA PROCESSING APPARATUS, IMAGE PROCESSING APPARATUS, AND METHODS AND PROGRAMS FOR PROCESSING IMAGE DATA

(75) Inventor: Hiroshi Kajihata, Tokyo (JP)

(73) Assignee: Sony Corporation, Tokyo (JP)

(*) Notice: Subject to any disclaimer, the term of this patent is extended or adjusted under 35 U.S.C. 154(b) by 973 days.

(21) Appl. No.: 11/300,310

(22) Filed: Dec. 15, 2005

(65) Prior Publication Data

US 2006/0147123 A1 Jul. 6, 2006

(30) Foreign Application Priority Data

Dec. 16, 2004 (JP) ............................. P2004-364437

(51) Int. Cl.
*G06K 9/40* (2006.01)
*H04N 7/12* (2006.01)
(52) U.S. Cl. ............. 382/268; 375/240.24; 375/240.29
(58) Field of Classification Search ........................ None
See application file for complete search history.

(56) References Cited

U.S. PATENT DOCUMENTS

| 6,225,923 B1* | 5/2001 | Andrews ..................... 341/94 |
| 6,917,310 B2* | 7/2005 | Pearson et al. ............... 341/50 |
| 6,922,492 B2* | 7/2005 | Yu et al. ..................... 382/260 |
| 2004/0005006 A1* | 1/2004 | Miura et al. ........... 375/240.24 |
| 2006/0078052 A1* | 4/2006 | Dang .................... 375/240.24 |

OTHER PUBLICATIONS

Sima et al, "An Effficient Architecture for Adaptive Deblocking Filter of H.264/AVC Video Coding", IEEE Trans. Consumer Electronics, vol. 50, No. 1, Feb. 2004, pp. 292-296.*

* cited by examiner

*Primary Examiner*—Yuzhen Ge
(74) *Attorney, Agent, or Firm*—Finnegan, Henderson, Farabow, Garrett & Dunner, L.L.P.

(57) ABSTRACT

A data processing apparatus capable of performing processing in units of block data by using processing results of other block data in a short time is provided, wherein a deblocking filter performs horizontal filtering processing and vertical filtering processing on first block data and second block data obtained by dividing restructured picture data into two in parallel by adjusting their dependency relation.

5 Claims, 23 Drawing Sheets

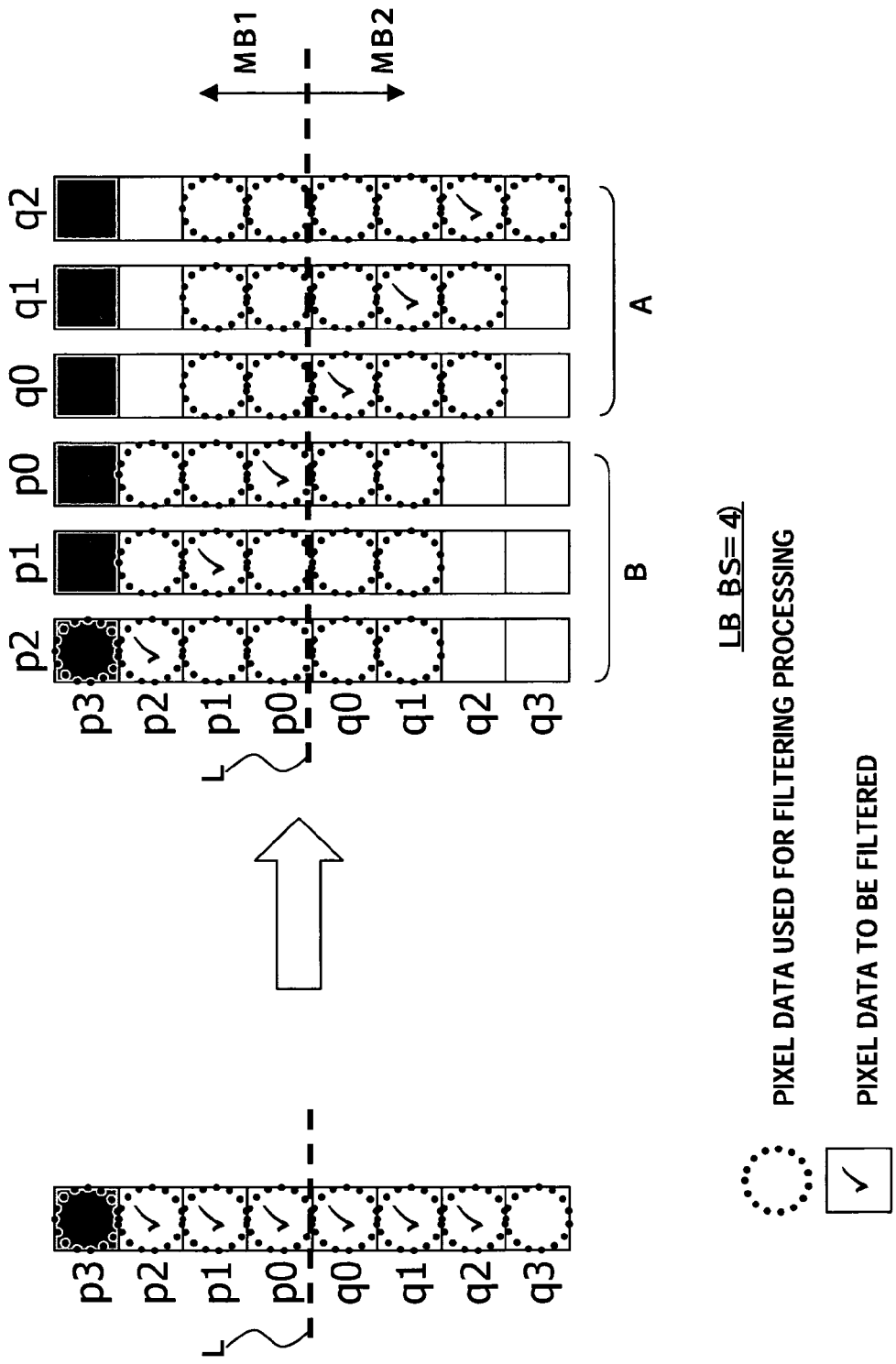

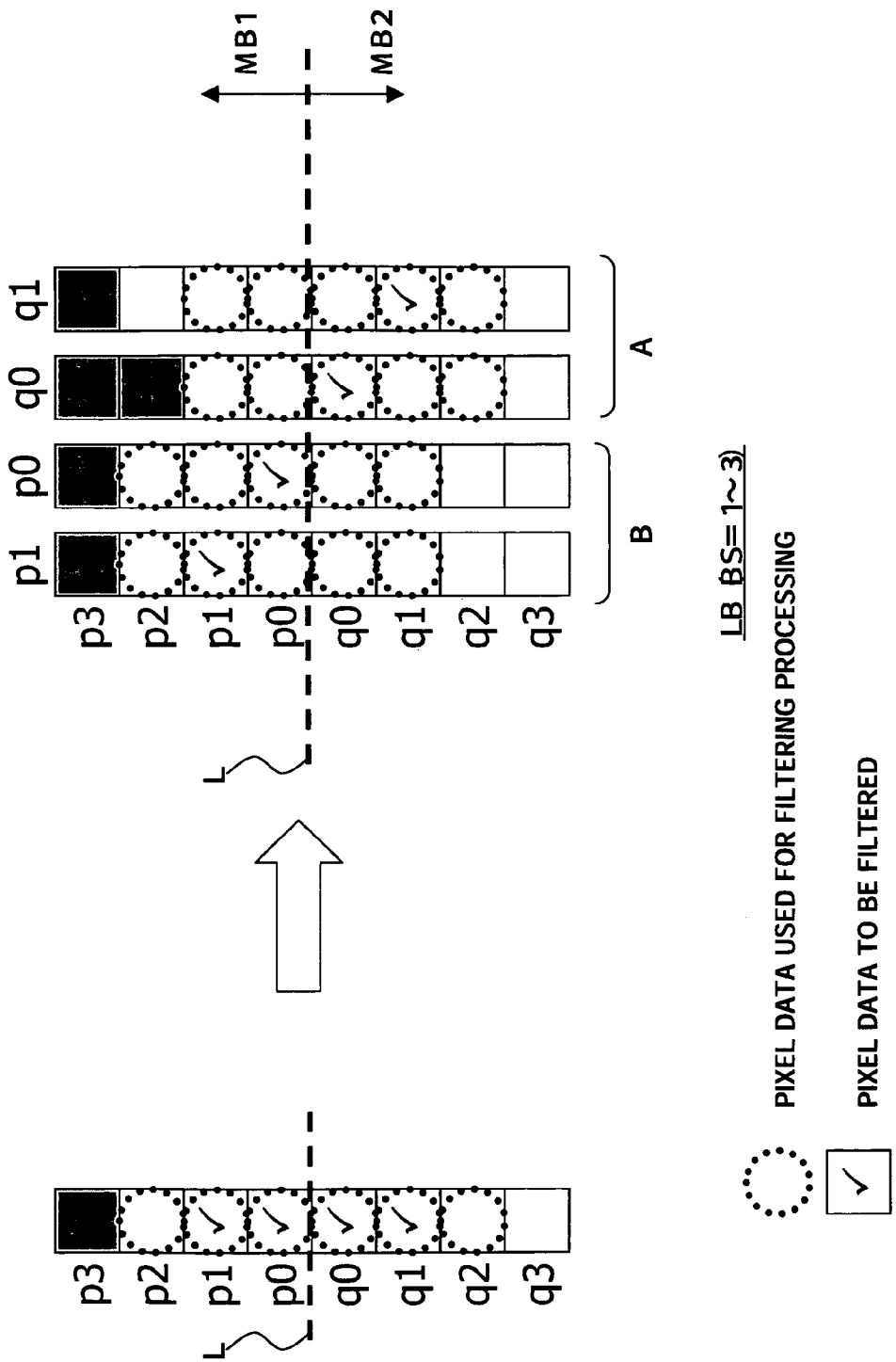

COLOR DIFFERENCE BLOCK CB

HF

VF

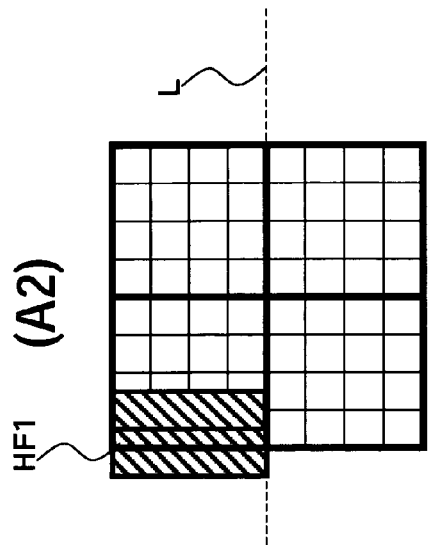
FIG. 12 (A2)
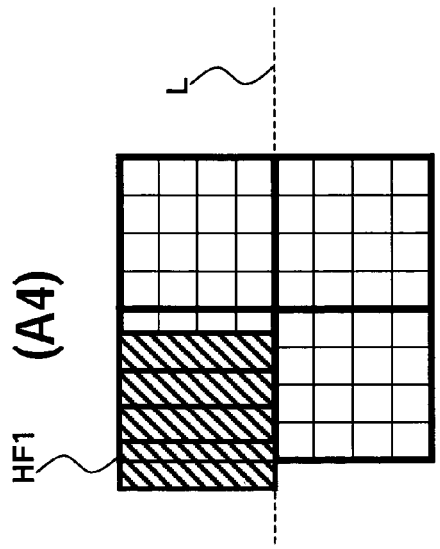
FIG. 12 (A4)
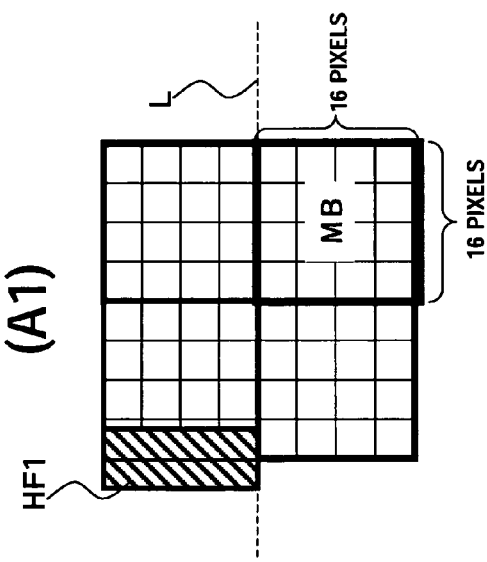
FIG. 12 (A1)
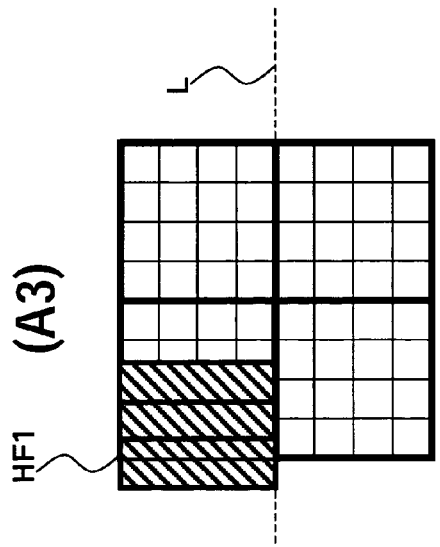
FIG. 12 (A3)
FILTER CIRCUIT 72

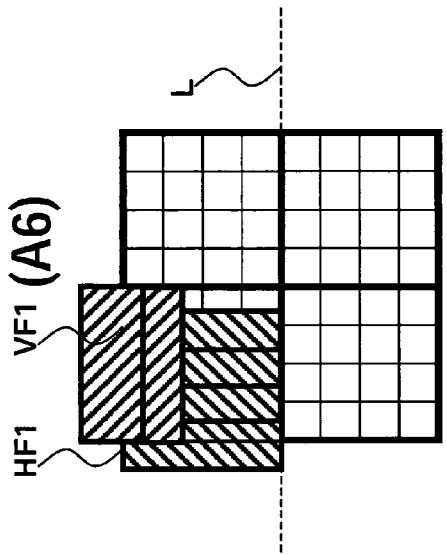
FIG. 13 (A5)
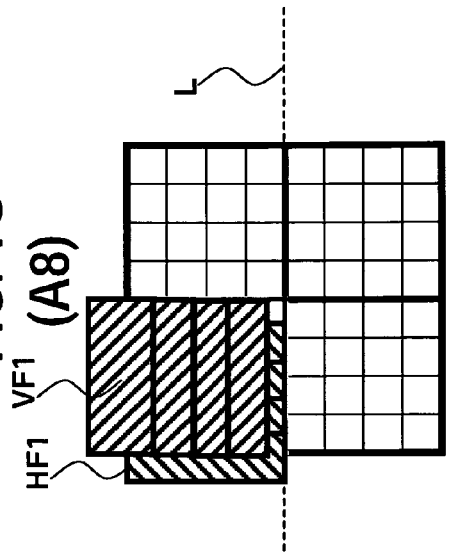
FIG. 13 (A6)
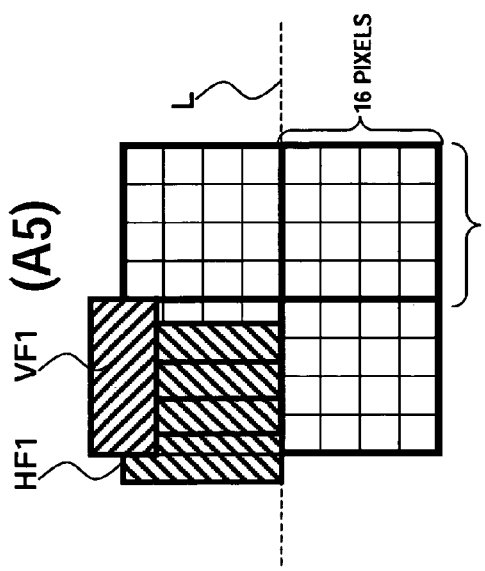
FIG. 13 (A7)
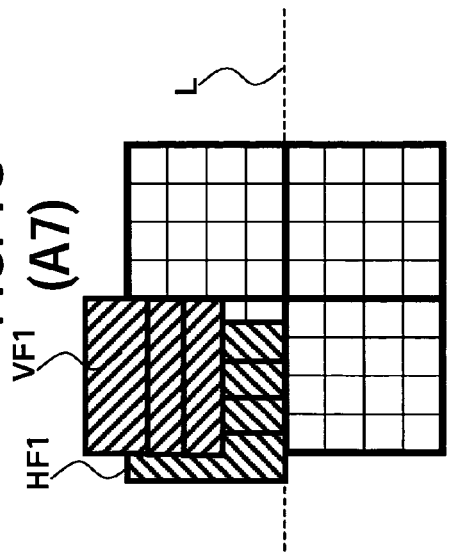
FIG. 13 (A8)
FILTER CIRCUIT 72

(A8)

(A9)

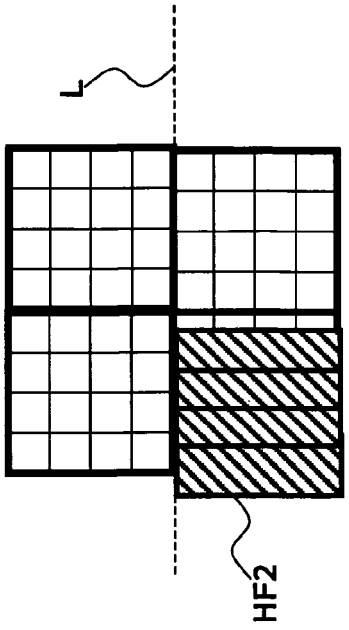
FIG. 16 (B2)
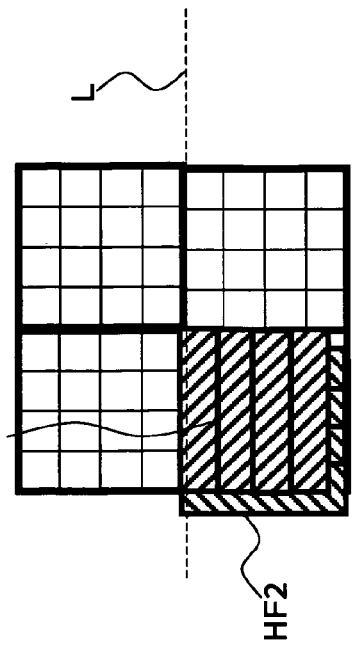
FIG. 16 (B4)
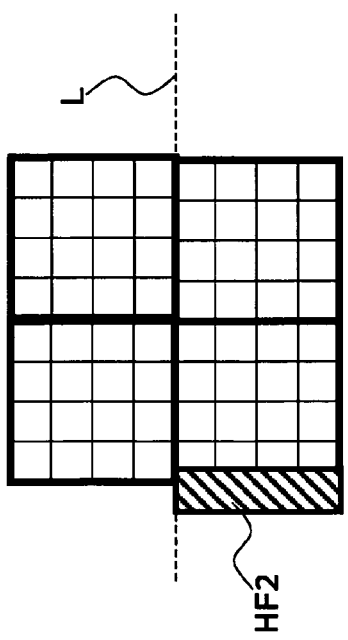
FIG. 16 (B1)
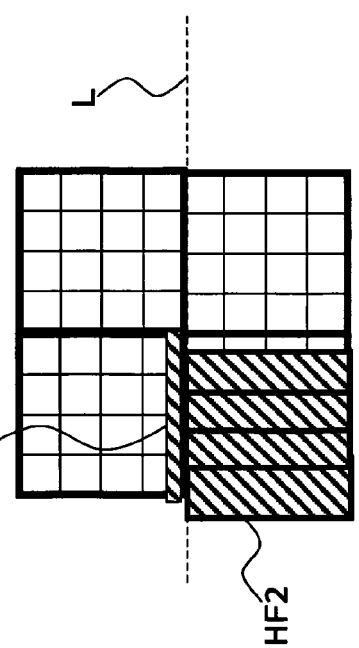
FIG. 16 (B3)

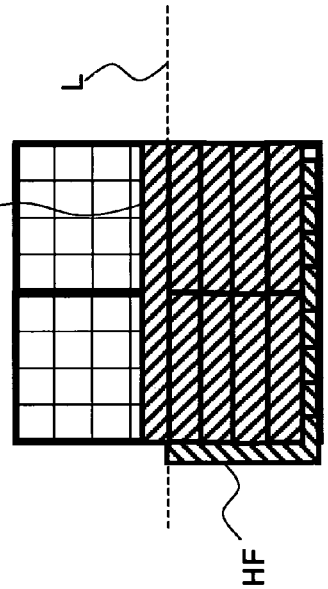
FIG. 17 (C2)
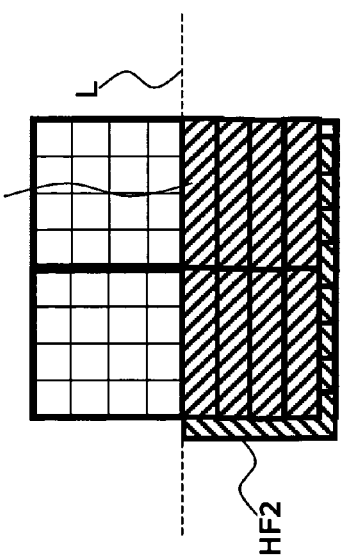
FIG. 17 (B5)
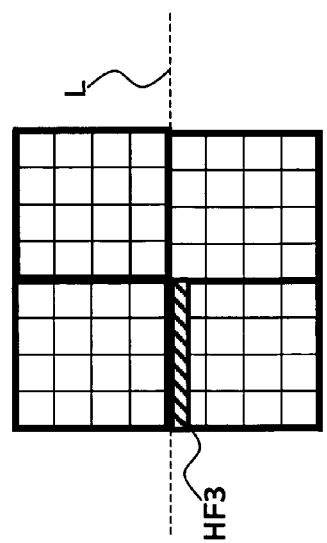
FIG. 17 (C1)

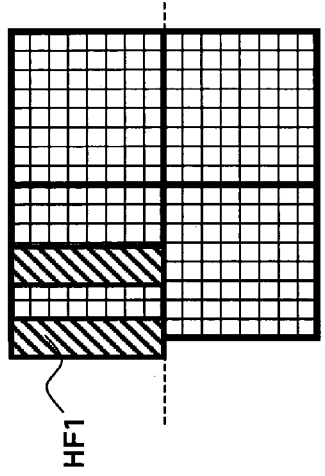
FIG. 18 (A2)
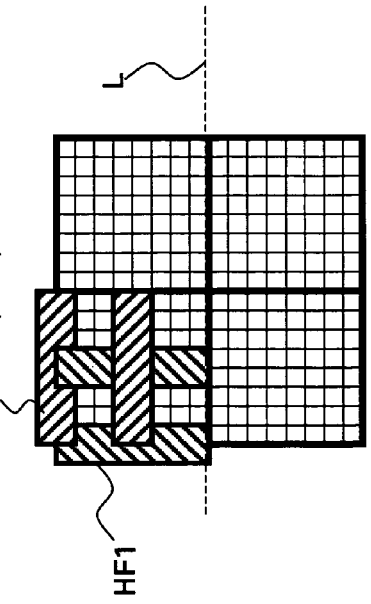
FIG. 18 (A4)
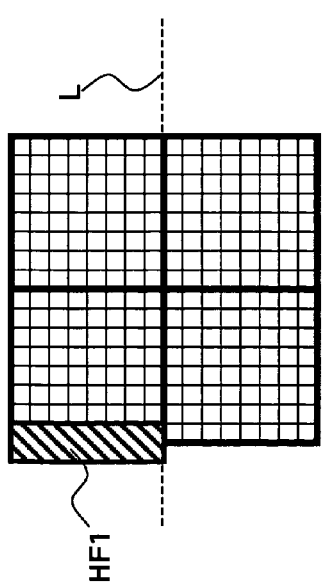
FIG. 18 (A1)
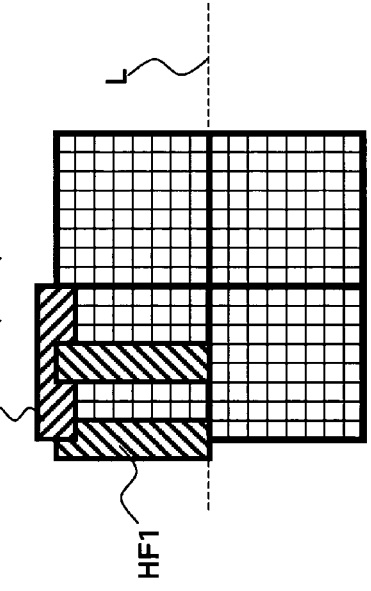
FIG. 18 (A3)

(A5)

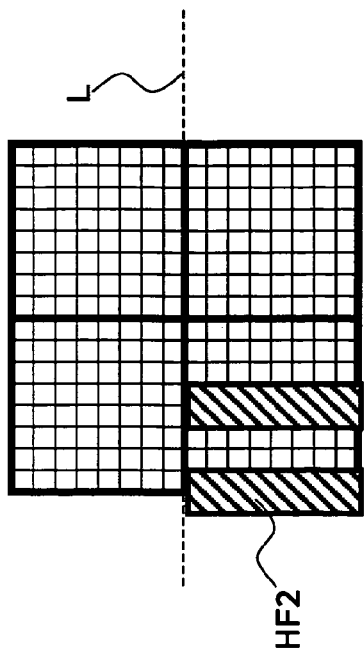
FIG. 20 (B2)
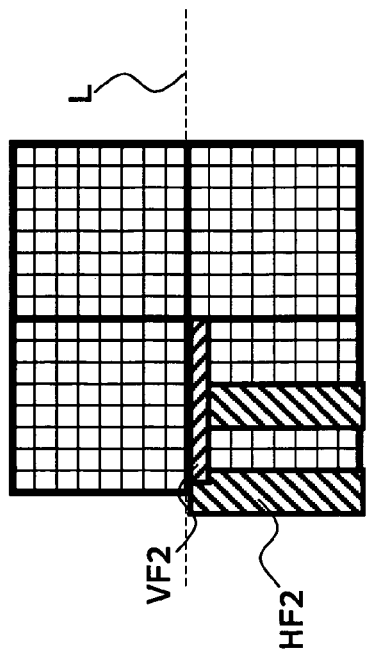
FIG. 20 (B4)
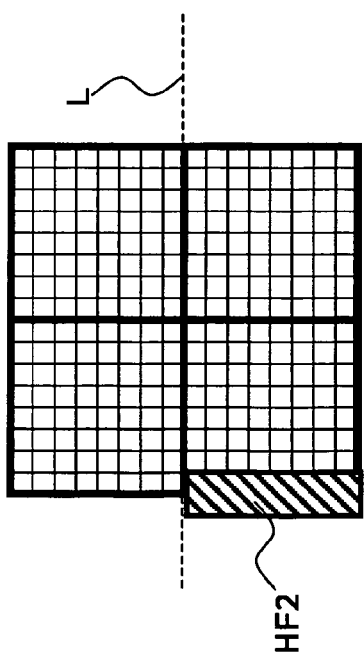
FIG. 20 (B1)
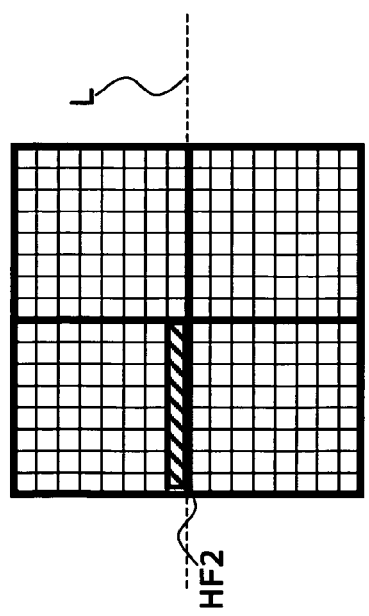
FIG. 20 (B3)

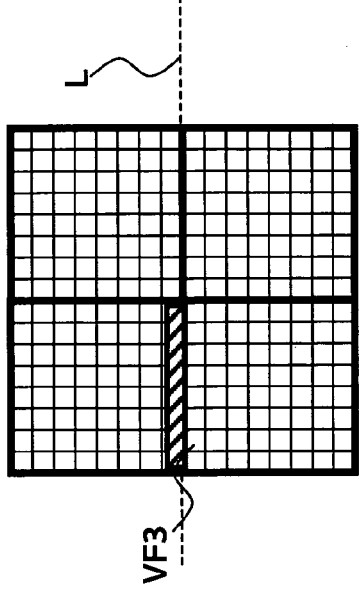
FIG. 21 (C2)
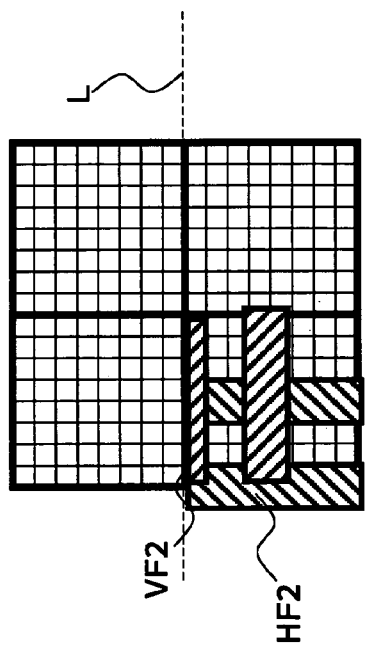
FIG. 21 (B5)
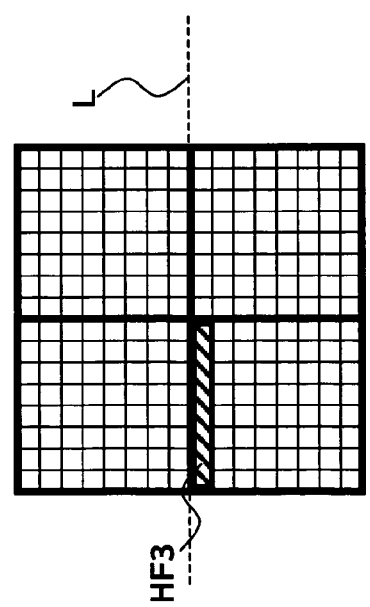
FIG. 21 (C1)

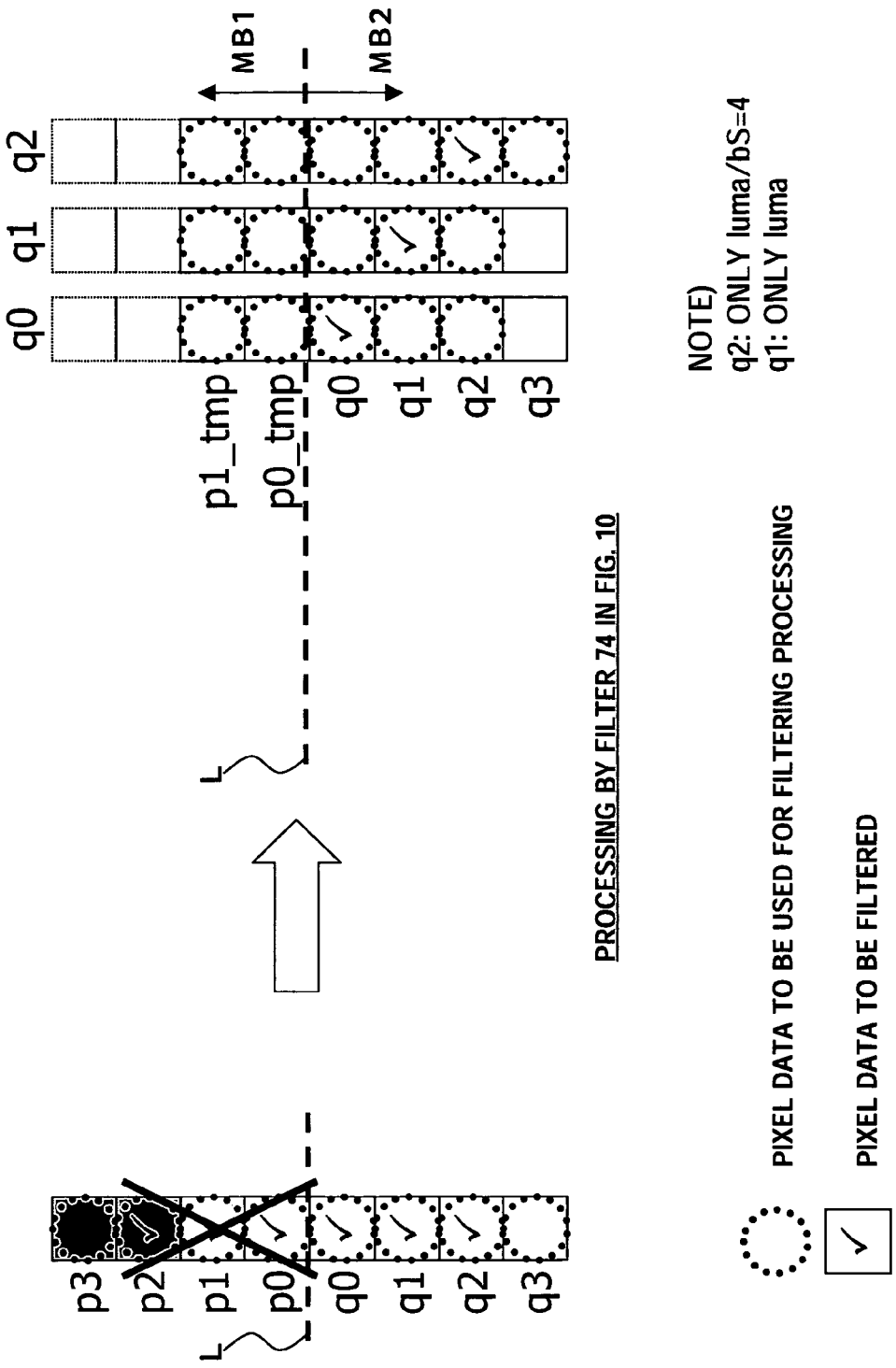

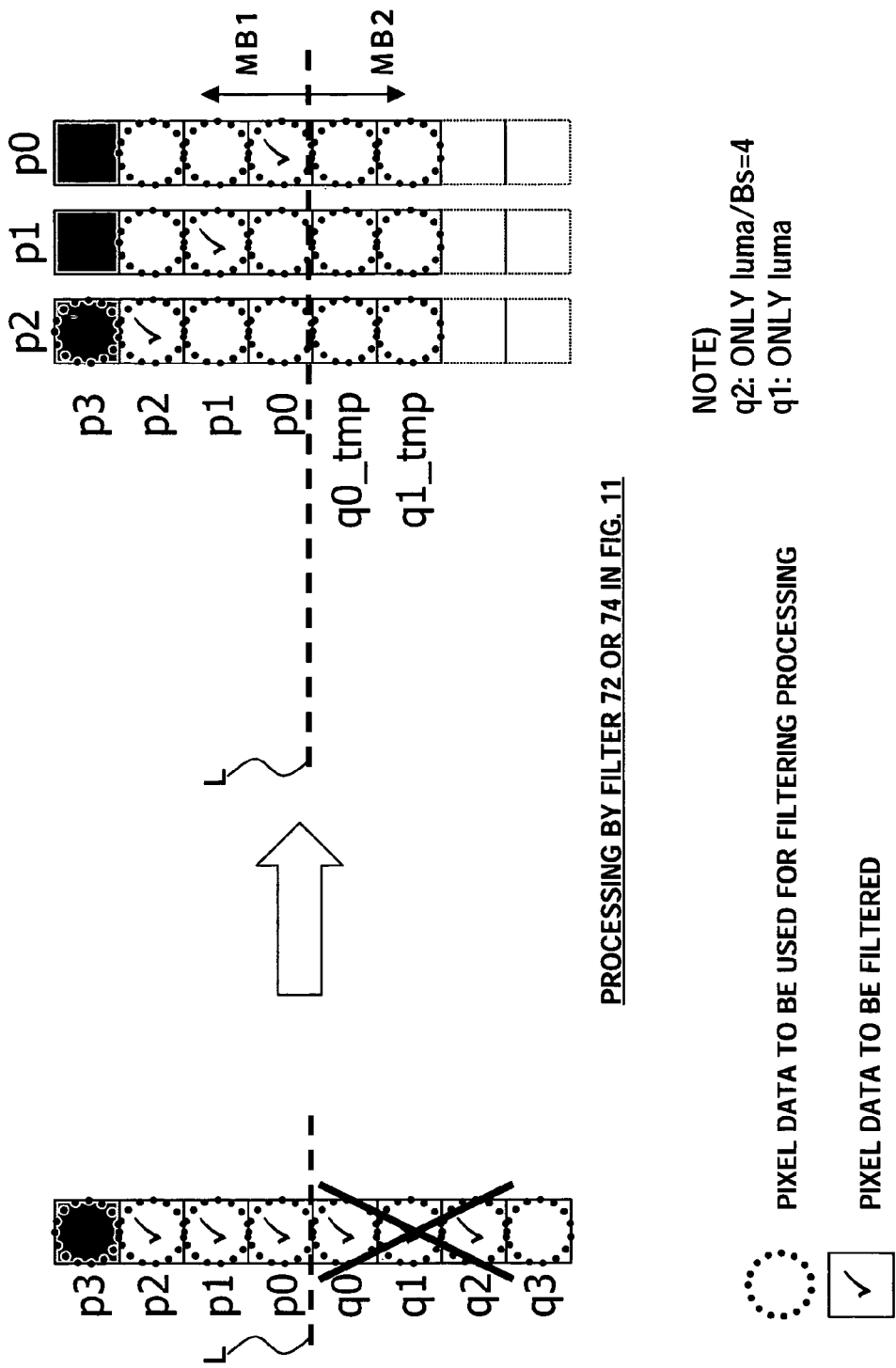

DATA PROCESSING APPARATUS, IMAGE PROCESSING APPARATUS, AND METHODS AND PROGRAMS FOR PROCESSING IMAGE DATA

CROSS REFERENCES TO RELATED APPLICATIONS

The present invention contains subject matter related to Japanese Patent Application JP 2004-364437 filed in the Japanese Patent Office on Dec. 16, 2004, the entire contents of which being incorporated herein by reference.

BACKGROUND OF THE INVENTION

1. Field of the Invention

The present invention relates to a data processing apparatus and an image processing apparatus for performing processing in units of block data by using a processing result of other block data, and their methods and programs.

2. Description of the Related Art

In recent years, an apparatus based on the MPEG (Moving Picture Experts Group) and other methods for compressing by discrete cosine transformation or other orthogonal transformation and motion compensation, wherein image data is handled as digital and redundancy peculiar to image information is utilized for highly efficient transmission and accumulation of information, has become widespread both in distributing information by broadcasting stations, etc. and receiving information in general households.

The MPEG2 and MPEG4 methods are followed by a proposal for an encoding method called an MPEG4/AVC (Advanced Video Coding).

In an encoding apparatus of the MPEG4/AVC method, data block filtering processing is performed on restructured image data in prediction encoding to generate reference image data to be used by next prediction encoding.

In the deblock filtering processing, filtering processing is performed on the reconfigured image data in units of macro blocks MB in the horizontal direction and in the vertical direction in turn.

In that case, filtering processing on each macro block MB depends on a filtering processing result of a micro block MB at a corresponding position above the macro block MB in the vertical direction.

SUMMARY OF THE INVENTION

The above explained deblock filtering processing includes an enormous amount of calculation, and the deblock filtering processing requires a long time in encoding processing.

However, parallel processing is difficult in the deblock filtering processing due to the dependency relation between macro blocks MB as explained above, so that it is difficult to shorten the processing time.

Systems for performing processing in units of block data using a processing result of other block data have the similar disadvantage.

It is desired to provide a data processing apparatus and an image processing apparatus capable of reducing processing time of processing performed in units of block data by using a processing result of other block data, and their methods and programs.

To solve the above disadvantages of the related art and attain the above object, according to a first invention, there is provided a data processing apparatus for performing predetermined processing on element data of a first block and a second block comprising: when processing on element data in the first block includes first processing not using the element data after subjected to the predetermined processing in the second block and second processing using first element data as a part of element data after subjected to the predetermined processing in the second block, and processing on the element data in the second block includes third processing not using the element data after subjected to the predetermined processing in the first block and fourth processing using second element data as a part of element data after subjected to the predetermined processing in the first block; a first processing means for performing the first processing; a second processing means for performing the third processing, fifth processing for generating the second element data in the first processing, and the fourth processing using the second element data obtained by the fifth processing in parallel with processing of the first processing means; a third processing means for performing the second processing by using the first element data obtained at least by one of the third processing and the fourth processing in the second processing means; and a fourth processing means for combining results of the first processing by the first processing means, results of the third processing and the fourth processing in the second processing means, and results of the second processing by the third processing means and outputting processing results of the first block and the second block.

According to a second invention, there is provided an image processing apparatus for performing filtering processing on a first block for defining a predetermined two-dimensional image and a second block for defining a two-dimensional image adjacent to the two-dimensional image, comprising a first processing means, a second processing means and a third processing means for each of the first block and the second block; when pixel data in the block is subjected to horizontal filtering processing using other pixel data at a different position in the horizontal direction but at the same position in the vertical direction and vertical filtering processing using other pixel data at a different position in the vertical direction but at the same position in the horizontal direction in turn, the horizontal filtering processing of the first block does not use pixel data of the second block, the vertical filtering processing of the first block uses second pixel data after subjected to the horizontal filtering processing at the same position in the horizontal direction in the second block for first pixel data as a part of the first block and pixel data in the second block is not used for other third pixel data, the horizontal filtering processing of the second block does not use pixel data of the first block, and the vertical filtering processing of the second block uses fifth pixel data after subjected to the horizontal filtering processing at the same first position in the horizontal direction in the first block for fourth pixel data as a part of the second block, and pixel data in the first block is not used for other sixth pixel data; wherein the first processing means performs the horizontal filtering processing on pixel data in the first block and the vertical filtering processing on the third pixel data in the first block in turn; the second processing means performs the horizontal filtering processing on the fifth pixel data in the first block, the horizontal filtering processing on pixel data in the second block, the vertical filtering processing on the fourth pixel data in the second block using the fifth pixel data after subjected to the horizontal filtering processing, and the vertical filtering processing on the sixth pixel data in the second block by using pixel data after subjected to the horizontal filtering processing in the second block in parallel with processing by the first processing means; and the third processing means performs the horizontal filtering processing on the second pixel data, and the vertical filtering processing on the first pixel data of the first block using the second pixel data after subjected to the horizontal filtering processing and processing results of the vertical filtering processing by the first processing means.

An effect of the image processing apparatus of the second invention is as below.

First, the first processing means performs the horizontal filtering processing on pixel data in the first block and the vertical filtering processing no the third pixel data in the first block in turn.

Also, the second processing means performs the horizontal filtering processing on the fifth pixel data in the first block, the horizontal filtering processing on pixel data in the second block, the vertical filtering processing on the fourth pixel data in the second block using the pixel data after subjected to the horizontal filtering processing, and the vertical filtering processing on the sixth pixel data in the second block using pixel data after subjected to the horizontal filtering processing in the second clock in parallel with processing by the first processing means.

Next, the third processing means performs the horizontal filtering processing on the second pixel data and the vertical filtering processing on the first pixel data of the first block by using the second pixel data after subjected to the horizontal filtering processing and processing results of the vertical filtering processing by the first processing means.

According to a third invention, there is provided a data processing method performed by data processing apparatus for performing predetermined processing on element data of a first block and a second block, including when processing on element data in the first block includes first processing not using the element data after subjected to the predetermined processing in the second block and second processing using first element data as a part of element data after subjected to the predetermined processing in the second block, and processing on the element data in the second block includes third processing not using the element data after subjected to the predetermined processing in the first block and fourth processing using second element data as a part of element data after subjected to the predetermined processing in the first block; a first step for performing for the first processing the third processing, fifth processing for generating the second element data in the first processing, and the fourth processing using the second element data obtained by the fifth processing in parallel; a second step for performing the second processing by using the first element data obtained at least by the third processing and the fourth processing obtained in the first step; and a third step for combining results of the first processing obtained in the first step, results of the third processing and the fourth processing and results of the second processing obtained in the second step and outputting processing results of the first block and the second block.

According to a fourth invention, there is provided an image processing method performed by a data processing apparatus for performing filtering processing on a first block for defining a predetermined two-dimensional image and a second block for defining a two-dimensional image adjacent to the two-dimensional image, including when, for each of the first block and the second block, pixel data in the block is subjected to horizontal filtering processing using other pixel data at a different position in the horizontal direction but at the same position in the vertical direction and vertical filtering processing using other pixel data at a different position in the vertical direction but at the same position in the horizontal direction in turn, the horizontal filtering processing of the first block does not use pixel data of the second block, the vertical filtering processing of the first block uses second pixel data after subjected to the horizontal filtering processing at the same position in the horizontal direction in the second block for first pixel data as a part of the first block and pixel data in the second block is not used for other third pixel data, the horizontal filtering processing of the second block does not use pixel data of the first block, and the vertical filtering processing of the second block uses fifth pixel data after subjected to the horizontal filtering processing at the same first position in the horizontal direction in the first block for fourth pixel data as a part of the second block, and pixel data in the first block is not used for other sixth pixel data; a first step for performing the horizontal filtering processing on pixel data in the first block and the vertical filtering processing on the third pixel data in the first block in turn; a second step for performing the horizontal filtering processing on the fifth pixel data in the first block, the horizontal filtering processing on pixel data in the second block, the vertical filtering processing on the fourth pixel data in the second block by using the fifth pixel data after subjected to the horizontal filtering processing, and the vertical filtering processing on the sixth pixel data in the second block using pixel data after subjected to the horizontal filtering processing in the second block in parallel with processing in the first step; and a third step for performing the horizontal filtering processing on the second pixel data, and the vertical filtering processing on the first pixel data of the first block using the second pixel data after subjected to the horizontal filtering processing and processing results of the vertical filtering processing obtained in the first step.

According to a fifth invention, there is provided a program executed by a data processing apparatus for performing predetermined processing on element data of a first block and a second block, by which the data processing apparatus performs; when processing on element data in the first block includes first processing not using the element data after subjected to the predetermined processing in the second block and second processing using first element data as a part of element data after subjected to the predetermined processing in the second block, and processing on the element data in the second block includes third processing not using the element data after subjected to the predetermined processing in the first block and fourth processing using second element data as a part of element data after subjected to the predetermined processing in the first block; a first step for performing for the first processing the third processing, fifth processing for generating the second element data in the first processing, and the fourth processing using the second element data obtained by the fifth processing in parallel; a second step for performing the second processing by using the first element data obtained at least by the third processing and the fourth processing obtained in the first step; and a third step for combining results of the first processing obtained in the first step, results of the third processing and the fourth processing, and results of the second processing obtained in the second step and outputting processing results of the first block and the second block.

According to the present invention, a data processing apparatus and an image processing apparatus capable of reducing processing time of processing performed in units of block data by using a processing result of other block data, and their methods and programs can be provided.

According to a sixth invention, there is provided a data processing apparatus for performing predetermined processing on element data of a first block and a second block, comprising: when processing on element data in said first block includes first processing not using said element data after subjected to the predetermined processing in said second block and second processing using first element data as a part of element data after subjected to said predetermined processing in said second block, and processing on said element data in said second block includes third processing not using said element data after subjected to said predetermined processing in said first block and fourth processing using second element data as a part of element data after subjected to said predetermined processing in said first block, a first processing circuit for performing said first processing; a second processing circuit for performing said third processing, fifth processing for generating said second element data in said first processing, and said fourth processing using said second element data obtained by said fifth processing in parallel with processing of said first processing circuit; a third processing circuit for performing said second processing by using said first element data obtained at least by one of said third processing and said fourth processing in said second processing circuit; and a fourth processing circuit for combining results of said first processing by said first processing circuit, results of said third processing and said fourth processing in said second processing circuit, and results of said second processing by said third processing circuit and outputting processing results of said first block and said second block.

BRIEF DESCRIPTION OF DRAWINGS

These and other objects and features of the present invention will become clearer from the following description of the preferred embodiments given with reference to the attached drawings, in which:

FIG. 6 is a view for explaining filtering processing (BS4) at a block boundary of a luminance block LB in the deblocking filter shown in FIG. 2;

FIG. 7 is a view for explaining filtering processing (BS1 to BS3) at the block boundary of the luminance block LB in the deblocking filter shown in FIG. 2;

FIG. 12 is a view for explaining filtering processing of a luminance block LB in a filter circuit 72 shown in FIG. 3;

FIG. 13 is a view for explaining filtering processing of the luminance block LB in the filter circuit 72 shown in FIG. 3;

FIG. 16 is a view for explaining filtering processing of a luminance block LB in a filter circuit 74 shown in FIG. 3;

FIG. 17 is a view for explaining filtering processing of the luminance block LB in the filter circuit 74 shown in FIG. 3;

FIG. 18 is a view for explaining filtering processing of a color difference block CB of the filter circuit 72 shown in FIG. 3;

FIG. 20 is a view for explaining filtering processing of the color difference block CB of the filter circuit 74 shown in FIG. 3;

FIG. 21 is a view for explaining filtering processing of the color difference block CB of the filter circuit 74 shown in FIG. 3;

FIG. 22 is a view for explaining a vertical filtering processing VF2 of the filter circuit 74 shown in FIG. 10; and FIG. 23 is a view for explaining processing of the filter circuit 72 or 74 shown in FIG. 11.

DESCRIPTION OF THE PREFERRED EMBODIMENT

Below, a communication system 1 of the present embodiment will be explained.

First, corresponding relationships of components of the embodiment of the present invention and those of the present invention will be explained.

Figure 1:
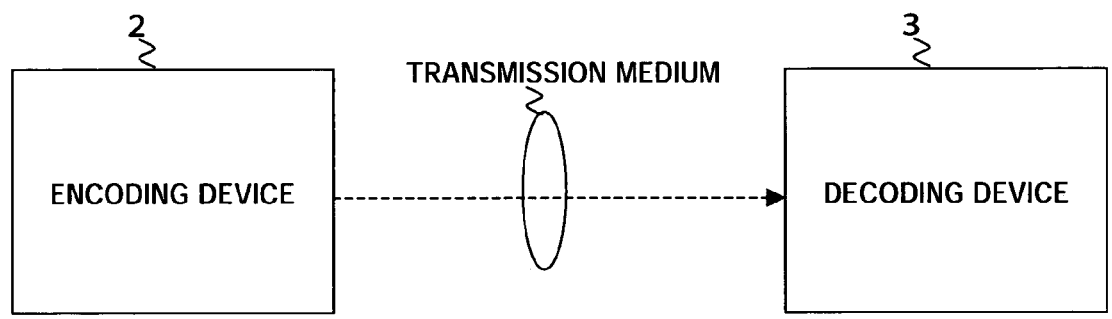
FIG. 1 is a view of the configuration of a communication system according to a first embodiment of the present invention.

FIG. 1 is a conceptual view of the communication system 1 of the present embodiment.

As shown in FIG. 1, the communication system 1 includes an encoding apparatus 2 provided on the transmission side and a decoding apparatus 3 provided on the receiving side.

The encoding apparatus 2 corresponds to the data processing apparatus and the encoding apparatus of the present invention.

In the communication system 1, the encoding apparatus 2 on the transmission side generates frame image data (a bit stream) compressed by discrete cosine transformation, Karhunen-Loeve transformation or other orthogonal transformation and motion compensation, modulates the frame image data, then, transmits via a transmission medium, such as satellite broadcasting, cable TV network, telephone line network and cellular phone network.

On the receiving side, after demodulating an image signal received by the decoding apparatus 3, frame image data expanded by inverse transformation of the orthogonal transformation at the modulation and motion compensation is generated and used.

Note that the transmission medium may be a recording medium, such as an optical disk, magnetic disk and semiconductor memory.

The decoding apparatus 3 shown in FIG. 1 has the same configuration as that in the related art and performs decoding in accordance with encoding by the encoding apparatus 2.

Below, the encoding apparatus 2 shown in FIG. 1 will be explained.

Figure 2:
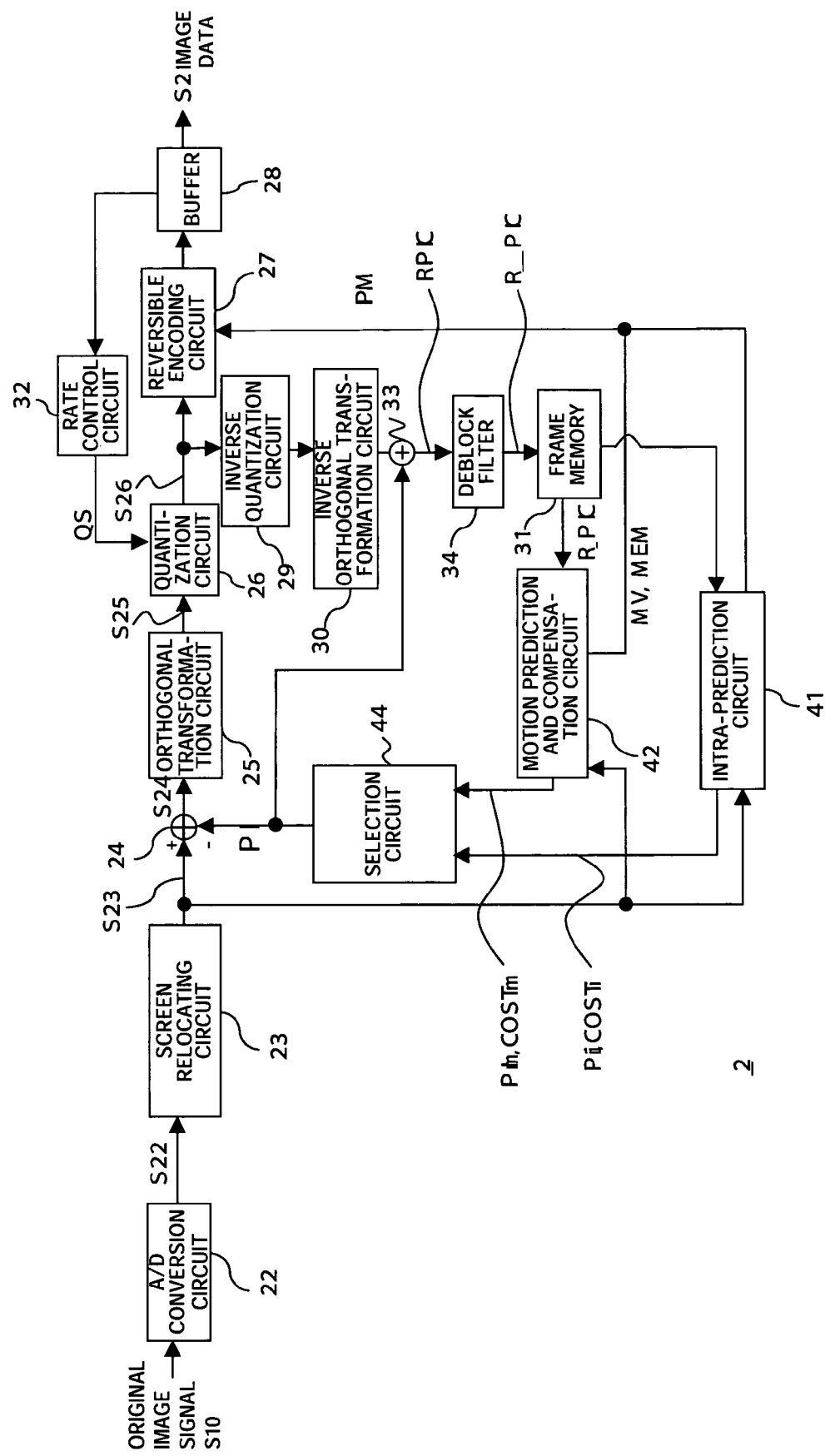
FIG. 2 is a functional block diagram of an encoding apparatus shown in FIG. 1.

FIG. 2 is a view of the overall configuration of the encoding apparatus 2 shown in FIG. 1.

As shown in FIG. 2, the encoding apparatus 2 includes, for example, an A/D conversion circuit 22, a screen relocating circuit 23, a computing circuit 24, an orthogonal transformation circuit 25, a quantization circuit 26, a reversible encoding circuit 27, a buffer memory 28, an inverse quantization circuit 29, an inverse orthogonal transformation circuit 30, a frame memory 31, a rate control circuit 32, an adding circuit 33, a deblocking filter 34, an intra-prediction circuit 41, a motion prediction compensation circuit 42 and a selection circuit 44.

In the encoding apparatus 2, the deblocking filter 34 adjusts dependency relations of horizontal filtering processing HF and vertical filtering processing VF for first block data BPIC1 and second block data BPIC2 obtained by dividing reconfigured picture data RPIC from the adding circuit 33 into two, and the horizontal filtering processing HF and the vertical filtering processing VF of the first block data BPIC1 and those of the second block data BPIC2 are performed in parallel.

Below, components of the encoding apparatus 2 will be explained.

[A/D Conversion Circuit 22]

The A/D conversion circuit 22 converts an input original image signal S10 composed of an analog luminance signal Y and color-difference signals Pb and Pr to digital picture data S22 and outputs the same to the screen relocating circuit 23 and an RGB conversion circuit 51.

[Screen Relocating Circuit 23]

The screen relocating circuit 23 relocates frame data in the picture data S22 input from the A/D conversion circuit 22 to be in an encoding order in accordance with the GOP (group of pictures) structure formed by picture types I, P and B of the frame data so as to obtain original image data S23, and outputs the same to the computing circuit 24, motion prediction compensation circuit 42 and intra-prediction circuit 41.

[Computing Circuit 24]

The computing circuit 24 generates image data S24 indicating a difference between the original image data S23 and prediction image data input from the selection circuit 44 and outputs the same to the orthogonal transformation circuit 25.

[Orthogonal Transformation Circuit 25]

The orthogonal transformation circuit 25 performs orthogonal transformation, such as discrete cosine transformation and Karhunen-Loeve transformation, on the image data S24 to generate image data (for example, a DCT coefficient) S25 and outputs the same to the quantization circuit 26.

[Quantization Circuit 26]

The quantization circuit 26 performs quantization on the image data S25 based on a quantization scale QS input from the rate control circuit 32 so as to generate image data S26 (a quantized DCT coefficient) and outputs the same to the reversible encoding circuit 27 and the inverse quantization circuit 29.

[Reversible Encoding Circuit 27]

The reversible encoding circuit 27 stores in the buffer memory 28 image data obtained by performing variable length encoding or arithmetic coding on the image data S26.

At this time, the reversible encoding circuit 27 stores in head data, etc. a motion vector MV input from the motion prediction compensation circuit 42 or a differential motion vector thereof, identification data of reference image data, and an intra-prediction mode input from the intra-prediction circuit 41.

[Buffer Memory 28]

Image data stored in the buffer memory 28 is subjected to modulation, etc. and transmitted.

[Inverse Quantization Circuit 29]

The inverse quantization circuit 29 generates data obtained by performing inverse quantization on the image data S26 and outputs the same to the inverse orthogonal transformation circuit 30.

[Inverse Orthogonal Transformation Circuit 30]

The inverse orthogonal transformation circuit 30 performs inverse transformation of the orthogonal transformation performed in the orthogonal transformation circuit 25 on the data input from the inverse quantization circuit 29 to generate image data and outputs the same to the adding circuit 33.

[Adding Circuit 33]

The adding circuit 33 adds the (decoded) image data input from the inverse orthogonal transformation circuit 30 and prediction image data PI input from the selection circuit 44 to generate restructured picture data RPD and outputs the same to the deblocking filter 34.

[Deblocking Filter 34]

The deblocking filter 34 writes to the frame memory 31 image data obtained by removing block distortions from the restructured image data input from the adding circuit 33 as reference picture data R_PIC.

Note that, in the frame memory 31, for example, restructured image data of pictures to be subjected to motion prediction compensation processing by the motion prediction compensation circuit 42 and intra-prediction processing by the intra-prediction circuit 41 is written successively in units of macro blocks MB after processing.

[Rate Control Circuit 32]

The rate control circuit 32 generates a quantization scale QS, for example, based on image data read from the buffer memory 28 and outputs the same to the quantization circuit 26.

[Intra-Prediction Circuit 41]

The intra-prediction circuit 41 generates prediction image data PIi of a macro block MB to be processed for each of a plurality of prediction modes, such as an intra 4×4 mode and an intra 16×16 mode, and based thereon and the macro block MB to be processed in the original image data S23, generates index data COSTi to be an index of a coding amount of encoded data.

Then, the intra-prediction circuit 41 selects an intra-prediction mode, by which the index data COSTi becomes minimum.

The intra-prediction circuit 41 outputs the prediction image data PIi and index data COSTi generated in accordance with the finally selected intra-prediction mode to the selection circuit 44.

Also, when receiving a selection signal S44 indicating that the intra-prediction mode is selected, the intra-prediction circuit 41 outputs a prediction mode IPM indicating the finally selected intra-prediction mode to the reversible encoding circuit 27.

Note that even in the case of a macro block MB belonging to a P-slice or B-slice, the intra-prediction encoding by the intra-prediction circuit 41 is sometimes performed.

The intra-prediction circuit 41 generates index data COSTi, for example, based on the formula (1) below.

[Formula 1]
$$COSTi = \sum_{1 \leq i \leq x} (SATD + \text{header\_cost}(\text{mode})) \qquad (1)$$

In the above formula (1), "i" indicates, for example, an identification number given to each block data having a size corresponding to the intra-prediction mode composing the macro block MB to be processed, and "x" becomes "1" in the case of the intra 16×16 mode and becomes "16" in the case of the intra 4×4 mode.

The intra-prediction circuit 41 calculates "SATD+header_cost(mode)" for all block data composing the macro block MB to be processed and calculates index data COSTi by adding them.

The "header_cost(mode)" is index data as an index of a coding amount of header data including a motion vector after encoding, identification data of reference image data, selected mode, quantization parameter (quantization scale), etc. A value of the "header_cost(mode)" varies in accordance with the prediction mode.

Also, "SATD" is index data as an index of a coding amount of differential image data between block data in the macro block MB to be processed and block data (prediction block data) determined in advance around the former block data.

In the present embodiment, the prediction image data PIi is regulated by a single or plurality of block data.

The "SATD" is, for example as shown in the formula (2), data obtained by performing Hadamard transformation (Tran) on a sum of absolute difference between pixel data of the block data to be processed "Org" and prediction block data "Pre".

The pixels in the block data are specified by "s" and "t" in the formula (2).

[Formula 2]
$$SATD = \sum_{s,t} (|Tran(Org(s,t) - Pre(s,t))|) \quad (2)$$

Note that "SAD" shown in the formula (3) below may be used instead of the "SATD".

Also, instead of the "SATD", other index indicating a distortion and residual error, such as SSD regulated by the MPEG4 and AVC, may be used.

[Formula 3]
$$SAD = \sum_{s,t} (|Org(s,t) - Pre(s,t)|) \quad (3)$$

[Motion Prediction Compensation Circuit 42]

The motion prediction compensation circuit 42 generates index data COSTm along with inter-encoding based on luminance components of the macro block MB to be processed in the original image data S23 input from the screen relocating circuit 23.

The motion prediction compensation circuit 42 searches a motion vector MV of the block data to be processed and generates prediction block data in units of block data regulated by a motion compensation mode based on reference picture data R_PIC encored in the past and stored in the frame memory 31 for each of predetermined plurality of motion prediction compensation modes.

A size of the block data and the reference picture data R_PIC are regulated, for example, by a motion prediction compensation mode.

A size of the block data is, for example, 16×16, 16×8, 8×16 or 8×8 pixels.

The motion prediction compensation circuit 42 determines a motion vector and reference picture data for each block data.

Note that, in 8×8 sized block data, the partition may be furthermore divided to 8×8, 8×4, 4×8 or 4×4.

In the motion prediction compensation circuit 42, the motion prediction compensation modes are, for example, an inter 16×16 mode, inter 8×16 mode, inter 16×8 mode, inter 8×8 mode, inter 8×4 mode, inter 4×8 mode and inter 4×4 mode, and the respective sizes of the block data are 16×16, 8×16, 16×8, 8×8, 8×4, 4×8 and 4×4.

Also, for the respective sizes of the motion prediction compensation modes, a front prediction mode, a rear prediction mode and bidirectional prediction mode can be selected.

Here, the front prediction mode is a mode using previous image data in a display order as reference image data, the rear prediction mode is a mode using subsequent image data in the display order as reference image data, and the bidirectional prediction mode is a mode using previous and subsequent image data as reference image data.

In the present embodiment, a plurality of reference image data can be used in the motion prediction compensation processing in the motion prediction compensation circuit 42.

Also, the motion prediction compensation circuit 42 generates for each of the motion prediction compensation modes index data COSTm to be an index of a total coding amount of block data having a block size corresponding to that of the motion prediction compensation mode composing the micro block MB to be processed in the original image data S23.

Then, the motion prediction compensation circuit 42 selects a motion prediction compensation mode, by which the index data COSTm become minimum.

Also, the motion prediction compensation circuit 42 generates prediction image data PIm obtained by selecting the motion prediction compensation mode.

The motion prediction compensation circuit 42 outputs to the selection circuit 44 the prediction image data PIm and index data COSTm generated in accordance with the finally selected motion prediction compensation mode.

Also, the motion prediction compensation circuit 42 outputs a motion vector generated in accordance with the selected motion prediction compensation mode or a differential motion vector of the motion vector and a prediction motion vector to the reversible encoding circuit 27.

Furthermore, the motion prediction compensation circuit 42 outputs a motion prediction compensation mode MEM indicating the selected motion prediction compensation mode to the reversible encoding circuit 27.

Also, the motion prediction compensation circuit 42 outputs identification data of reference image data (a reference frame) selected in the motion prediction compensation processing to the reversible circuit 27.

The motion prediction compensation circuit 42 generates the index data COSTm, for example, based on the formula (4) below.

[Formula 4]
$$COSTm = \sum_{1 \leq i \leq x} (SATD + \text{header\_cost(mode)}) \quad (4)$$

Also, in the formula (4), "i" indicates, for example, an identification number given to each block data having a size corresponding to the motion prediction compensation mode composing the macro block MB to be processed.

Namely, the motion prediction compensation circuit 42 calculates "SATD+header_cost(mode)" for all block data composing the macro block MB to be processed and calculates index data COSTm by adding them.

The "header_cost(mode)" is index data as an index of a coding amount of header data including motion vector after encoding, identification data of reference image data, selected mode, quantization parameter (quantization scale), etc. A value of the "header_cost(mode)" varies in accordance with the motion prediction compensation mode.

Also, "SATD" is index data to be an index of a code amount of differential image data between block data in the macro block MB to be processed and block data (prediction block data) in reference image data specified by a motion vector MV.

In the present embodiment, the prediction image data PIm is regulated by a single or plurality of reference block data.

The "SATD" is, for example as shown in the formula (5) below, data obtained by performing Hadamard transformation (Tran) on a sum of absolute difference between pixel data of the block data "Org" to be processed and prediction block data "Pre".

The pixels in the block data are specified by "s" and "t" in the formula (5).

[Formula 5]
$$SATD = \sum_{s,t} (|Tran(Org(s,t) - Pre(s,t))|) \quad (5)$$

Note that "SAD" shown in the formula (6) below may be used instead of the "SATD".

Also, instead of the "SATD", other index indicating a distortion and residual error, such as SSD regulated by the MPEG4 and AVC, may be used.

[Formula 6]
$$SAD = \sum_{s,t} (|Org(s,t) - Pre(s,t)|) \quad (6)$$

[Selection Circuit 44]

The selection circuit 44 specifies the smaller of the index data COSTm input from the motion prediction compensation circuit 42 and the index data COSTi input from the intra-prediction circuit 41 and outputs prediction image data PIm or PIi input in accordance with the specified index data to the computing circuit 24 and the adding circuit 33.

Also, when the index data COSTm is smaller, the selection circuit 44 outputs to the motion prediction compensation circuit 42 a selection signal S44 indicating that inter encoding (motion prediction compensation mode) is selected.

On the other hand, when the index COSTi is smaller, the selection circuit 44 outputs to the motion prediction compensation circuit 42 a selection signal S44 indicating that the intra encoding (intra-prediction mode) is selected.

Note that, in the present embodiment, all index data COSTi and COSTm generated by the intra-prediction circuit 41 and the motion prediction compensation circuit 42 may be output to the selection circuit 44, and the minimum index data may be specified in the selection circuit 44.

Below, the deblocking filter 34 will be explained in detail.

[Deblocking Filter 34]

Figure 3:
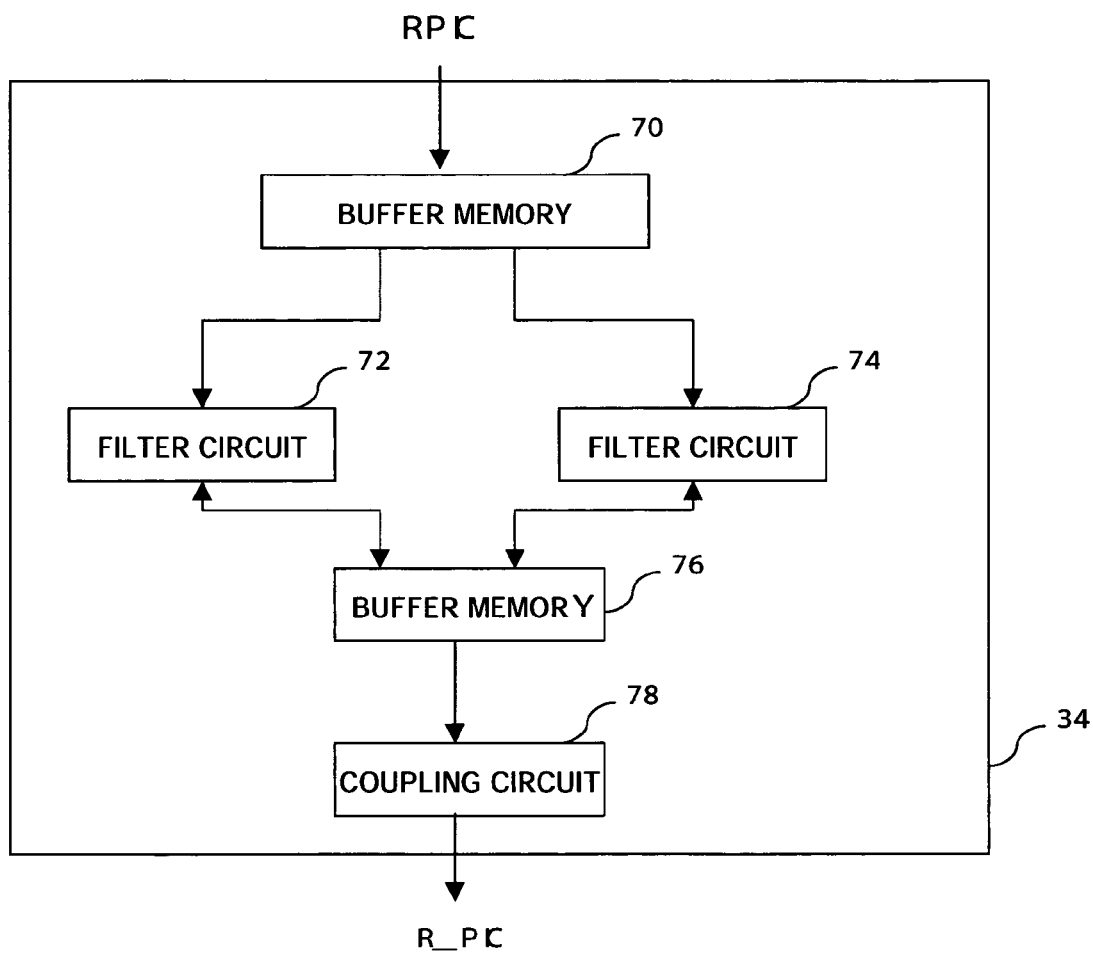
FIG. 3 is a view of the configuration of a deblocking filter shown in FIG. 2.

FIG. 3 is a view of the configuration of the deblocking filter shown in FIG. 2.

As shown in FIG. 3, the deblocking filter 34 includes, for example, a buffer memory 70, a filter circuit 72, a filter circuit 74, a buffer memory 76 and a coupling circuit 78.

The buffer memory 70 stores restructured picture data RPIC input from the adding circuit 33.

Figure 4:
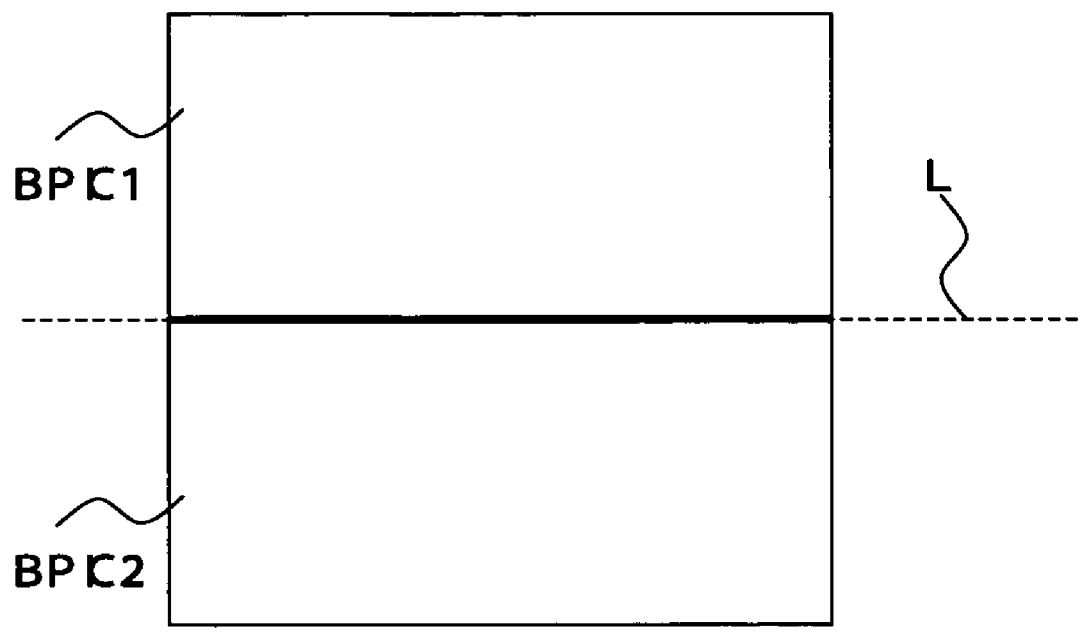
FIG. 4 is a view for explaining processing of the deblocking filter shown in FIG. 2.

The filter circuit 72 mainly performs filtering processing in the horizontal direction and in the vertical direction using first block data BPIC1 as one of restructured picture data RPIC divided to two as shown in FIG. 4.

The filter circuit 74 mainly performs filtering processing in the horizontal direction and in the vertical direction using second block data BPIC2 as one of restructured picture data RPD divided to two as shown in FIG. 4.

The buffer memory 76 stores results of the filtering processing by the filter circuit 72 and the filter circuit 74.

The coupling circuit 78 combines the results of the filtering processing stored in the buffer memory 76 to generate reference picture data R_PIC after deblocking filtering processing and writes the same to the frame memory 31.

Below, deblocking filtering processing performed by the deblocking filter 34 will be explained.

The deblocking filter 34 performs deblock filtering processing on each of a luminance block LB and a color difference block CB composing a macro block MB in units of macro blocks MB.

In the present embodiment, deblocking filtering processing of a luminance block LB indicates deblocking filtering processing using pixel data in the luminance block LB.

Also, deblock filtering processing of a color difference block CB indicates deblock filtering processing using pixel data in the color difference block CB.

The deblocking filter 34 successively performs filtering processing in the horizontal direction and that in the vertical direction on luminance block LB and color difference block CB, respectively.

First, filtering processing of a luminance block LB will be explained.

Figure 5B:
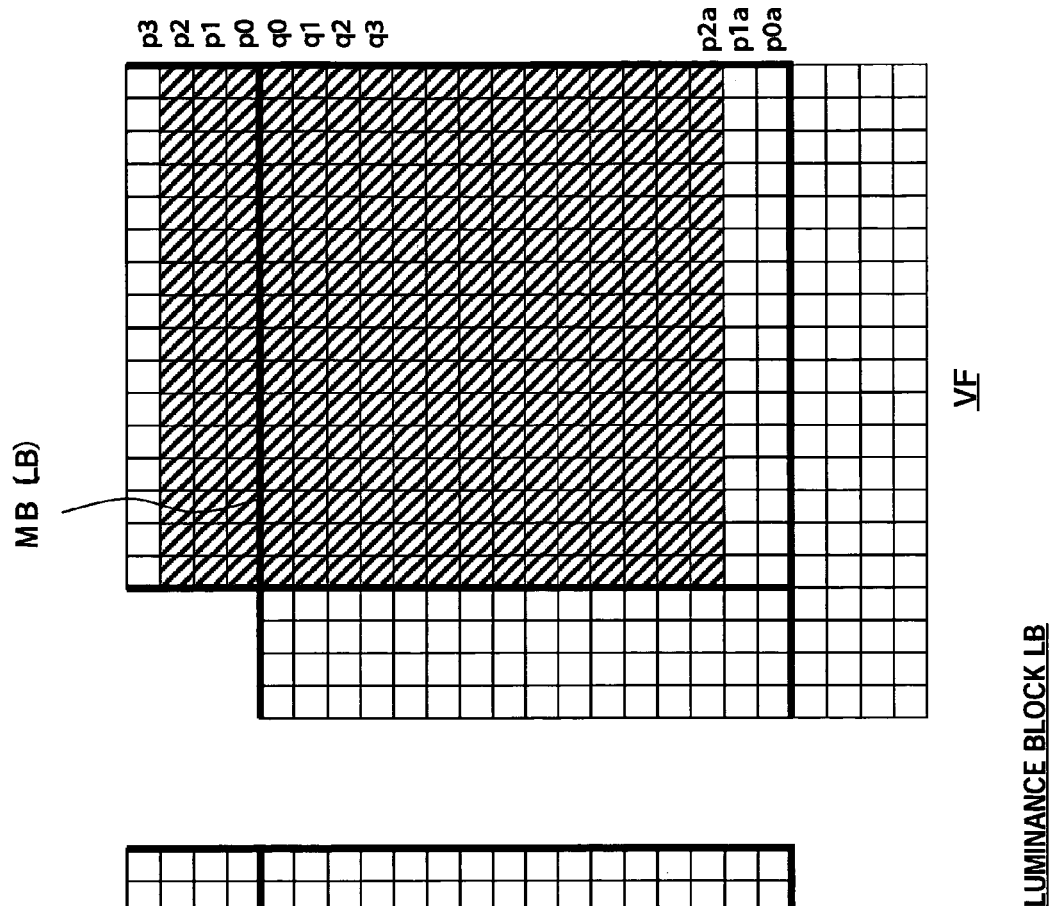
FIG. 5 is a view for explaining filtering processing of a luminance block LB in the deblocking filter shown in FIG. 2.
Figure 5A:
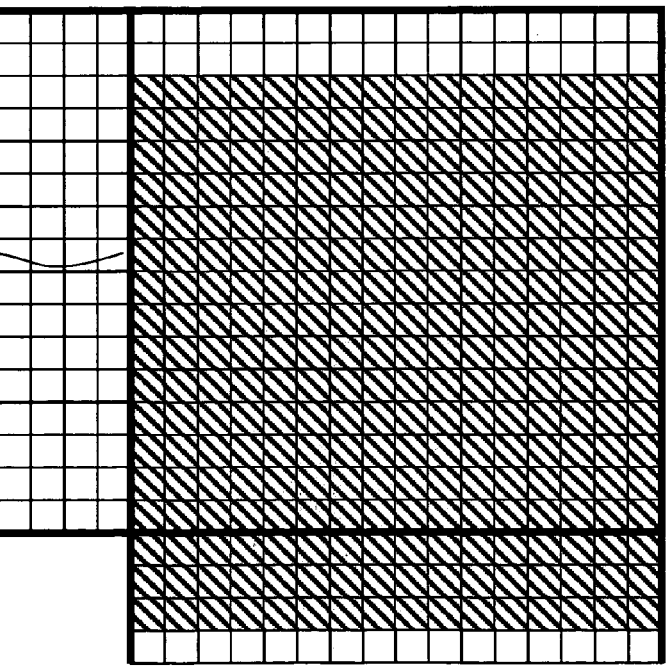

FIG. 5A is a view for explaining horizontal filtering processing HF of a luminance block LB of a macro block MB, and FIG. 5B is a view for explaining vertical filtering processing VF in the vertical direction of a luminance block LB of a macro block MB.

As indicated by shading in FIG. 5B, in vertical filtering processing VF of a luminance block LB, the deblocking filter 34 uses pixel data after the horizontal filtering processing in the luminance block LB and pixel data after filtering processing in a luminance block LB positioned above the luminance block LB to be processed (a luminance block LB of a block image displayed being adjacent to the block image of the luminance block LB in the vertical direction on the screen) to generate a vertical filtering processing result of pixel data in an amount of 3 lines (p0, p1 and p2) of the luminance block LB positioned above and pixel data in an amount of 14 lines (q0, q1, q2, q3, . . . ) in the luminance block LB to be processed.

The deblocking filter 34 performs the vertical filtering processing VF on pixel data to be processed by predetermined calculation by using a predetermined number of pixel data positioned in the vertical direction.

Below, the vertical processing VF of a luminance block LB performed by the deblocking filter 34 will be explained specifically.

The deblocking filter 34 defines four filtering modes (BS1 to BS4) based on a relation between a macro block MB to be processed and a macro block MB above it.

In the respective horizontal filtering processing HF and vertical filtering processing VF, the deblocking filter 34 selects a filtering mode BS4 when satisfying a condition that the predetermined number of pixel data to be used in the filtering processing belongs to a macro block MB to be subjected to intra encoding and a module composed of the predetermined number of pixel data positions on a boundary of the macro block MB.

While, when the condition is not satisfied, the deblocking filter 34 selects filtering modes BS1 to BS4 by following a predetermined condition.

Note that the filtering mode BS0 is a mode for not performing filtering processing, and the filtering mode BS4 is a mode for performing stronger filtering processing comparing with those in the case of the filtering modes BS1 to BS3.

When the filtering mode BS4 is selected, the deblocking filter 34 performs vertical filtering processing VF on pixel data p2 in a micro block MB1 as shown in FIG. 6 by using four pixel data p0, p1, p2 and p3 in the same column as the pixel data p2 in the macro block MB1 and two pixel data q0 and q1 in the same column in the macro block MB2 below the macro block MB1 adjacent thereto.

When the filtering mode BS4 is selected, the deblocking filter 34 performs vertical filtering processing VF on pixel data p1 in a micro block MB1 as shown in FIG. 6 by using three pixel data p0, p1 and p2 in the same column as the pixel data p1 in the macro block MB1 and two pixel data q0 and q1 in the same column in the macro block MB2.

When the filtering mode BS4 is selected, the deblocking filter 34 performs vertical filtering processing VF on pixel data p0 in a micro block MB1 as shown in FIG. 6 by using three pixel data p0, p1 and p2 in the same column as the pixel data p0 in the macro block MB1 and two pixel data q0 and q1 in the same column in the macro block MB2.

When the filtering mode BS4 is selected, the deblocking filter 34 performs vertical filtering processing VF on pixel data q0 in a micro block MB2 as shown in FIG. 6 by using pixel data p0 and p1 in the same column in the macro block MB1 and pixel data q0, q1 and q2 in the same column in the macro block MB2.

When the filtering mode BS4 is selected, the deblocking filter 34 performs vertical filtering processing VF on pixel data q1 in a micro block MB2 as shown in FIG. 6 by using pixel data p0 and p1 in the same column in the macro block MB1 and pixel data q0, q1 and q2 in the same column in the macro block MB2.

When the filtering mode BS4 is selected, the deblocking filter 34 performs vertical filtering processing VF on pixel data q2 in a micro block MB2 as shown in FIG. 6 by using pixel data p0 and p1 in the same column in the macro block MB1 and pixel data q0, q1, q2 and q3 in the same column in the macro block MB2.

As explained above, in the vertical filtering processing VF when the filtering mode BS4 is selected, a result of horizontal filtering processing HF of lines p0 and p1 of other macro block MB positioned above and adjacent to the macro block MB is used and pixel data other than that of the lines p0 and p1 of the macro block MB is not used.

When a filter mode is selected from BS1 to BS3, the deblock filter 34 performs vertical filtering processing VF on the pixel data p1 in the macro block MB1 as shown in FIG. 7 by using three pixel data p0, p1 and p2 in the same column as the pixel data p1 in the macro block MB1 and two pixel data q0 and q1 in the same column in the macro block MB2.

When a filter mode is selected from BS1 to BS3, the deblock filter 34 performs vertical filtering processing VF on the pixel data p0 in the macro block MB1 as shown in FIG. 7 by using three pixel data p0, p1 and p2 in the same column as the pixel data p0 in the macro block MB1 and two pixel data q0 and q1 in the same column in the macro block MB2.

When a filter mode is selected from BS1 to BS3, the deblock filter 34 performs vertical filtering processing VF on the pixel data q0 in the macro block MB2 as shown in FIG. 7 by using pixel data p0 and p1 in the same column in the macro block MB1 and pixel data q0, q1 and q2 in the same column in the macro block MB2.

When a filter mode is selected from BS1 to BS3, the deblock filter 34 performs vertical filtering processing VF on the pixel data q1 in the macro block MB2 as shown in FIG. 7 by using pixel data p0 and p1 the same column in the macro block MB1 and pixel data q0, q1 and q2 in the same column in the macro block MB2.

As explained above, in the vertical filtering processing VF when the filtering mode is selected from BS1 to BS3, a result of the horizontal filtering processing HF of lines p0 and p1 in an adjacent other macro block MB positioned above the macro block MB is used and pixel data other than that of the lines p0 and p1 of the macro block MB is not used.

Below, filtering processing of a color difference block CB will be explained.

In the case of a luminance block LB explained above, filtering processing is performed on 16×16 pixel data, while in the case of a color difference block CB, filtering processing is performed on 8×8 pixel data.

Figure 8A:
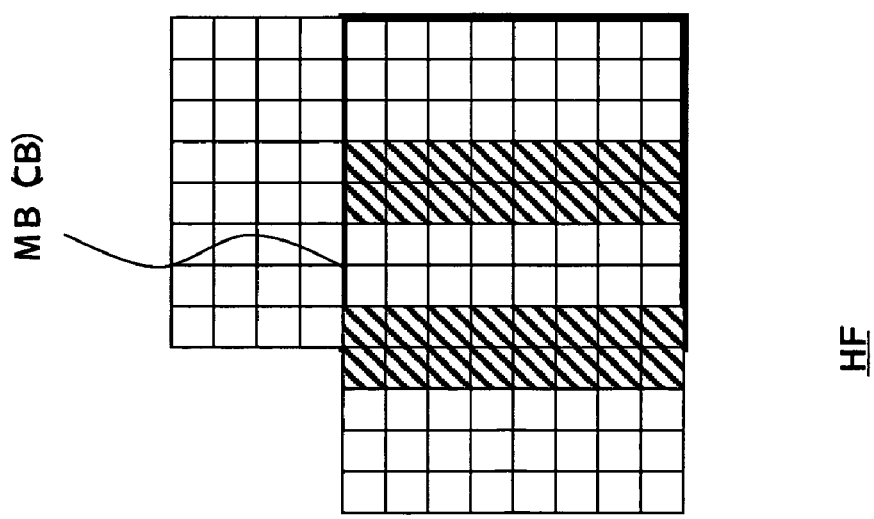
FIG. 8 is a view for explaining filtering processing of a color difference block CB in the deblocking filter shown in FIG. 2.

As indicated by shading in FIG. 8A, in horizontal filtering processing HF of a color difference block CB, the deblocking filter 34 uses pixel data in the color difference block CB to generate a horizontal filtering processing result of pixel data in an amount of one row of color difference blocks CB on the left of the color difference block CB to be processed (a color difference block CB of a block image displayed being adjacent to a block image of the color difference block CB on the left on the screen), pixel data in an amount of one row adjacent to a boundary line on the left side in the color difference block CB, and pixel data on the fourth or fifth row from the boundary line on the left side in the color difference block CB.

The deblocking filter 34 performs the horizontal filtering processing HF on the image data to be processed by performing predetermined calculation by using a predetermined number of pixel data positioning in the horizontal direction.

As explained above, in the horizontal filtering processing HF of a color difference block CB, pixel data of a macro block MB positioned above or below the macro block is not used.

Figure 8B:
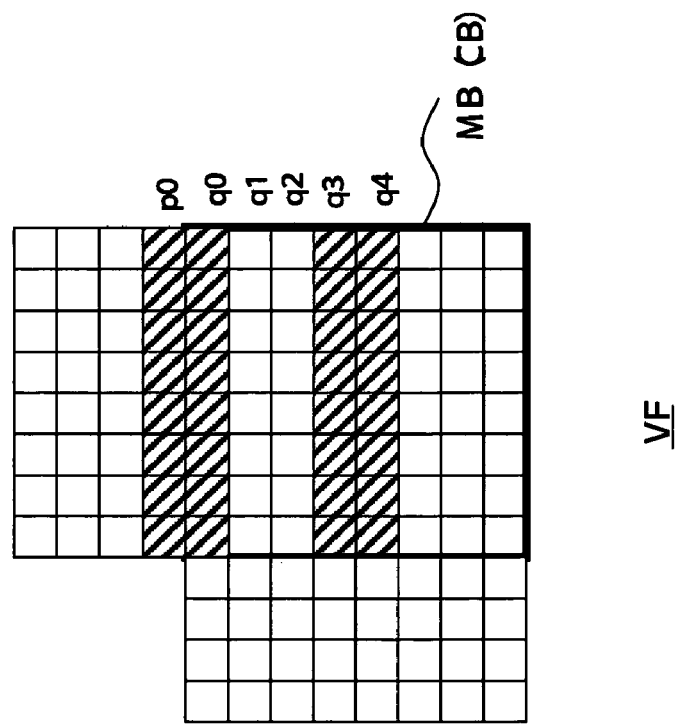

Next, as indicated by shading in FIG. 8B, the deblocking filter 34 uses pixel data in the color difference block CB, pixel data after the horizontal filtering processing, and pixel data after filtering processing of an upper macro block MB to generate pixel data in an amount of one row (p0) of a vertical filtering processing result of a color difference block CB above the color difference block CB (a color difference block CB of a block image displayed above and adjacent to a block image of the color difference block CB) and pixel data of three rows (q0, q3 and q4) in the color difference block CB.

The deblocking filter 34 performs predetermined calculation by using a predetermined number of pixel data positioning in the vertical direction to perform the vertical filtering processing VF on the pixel data to be processed.

Figure 9:
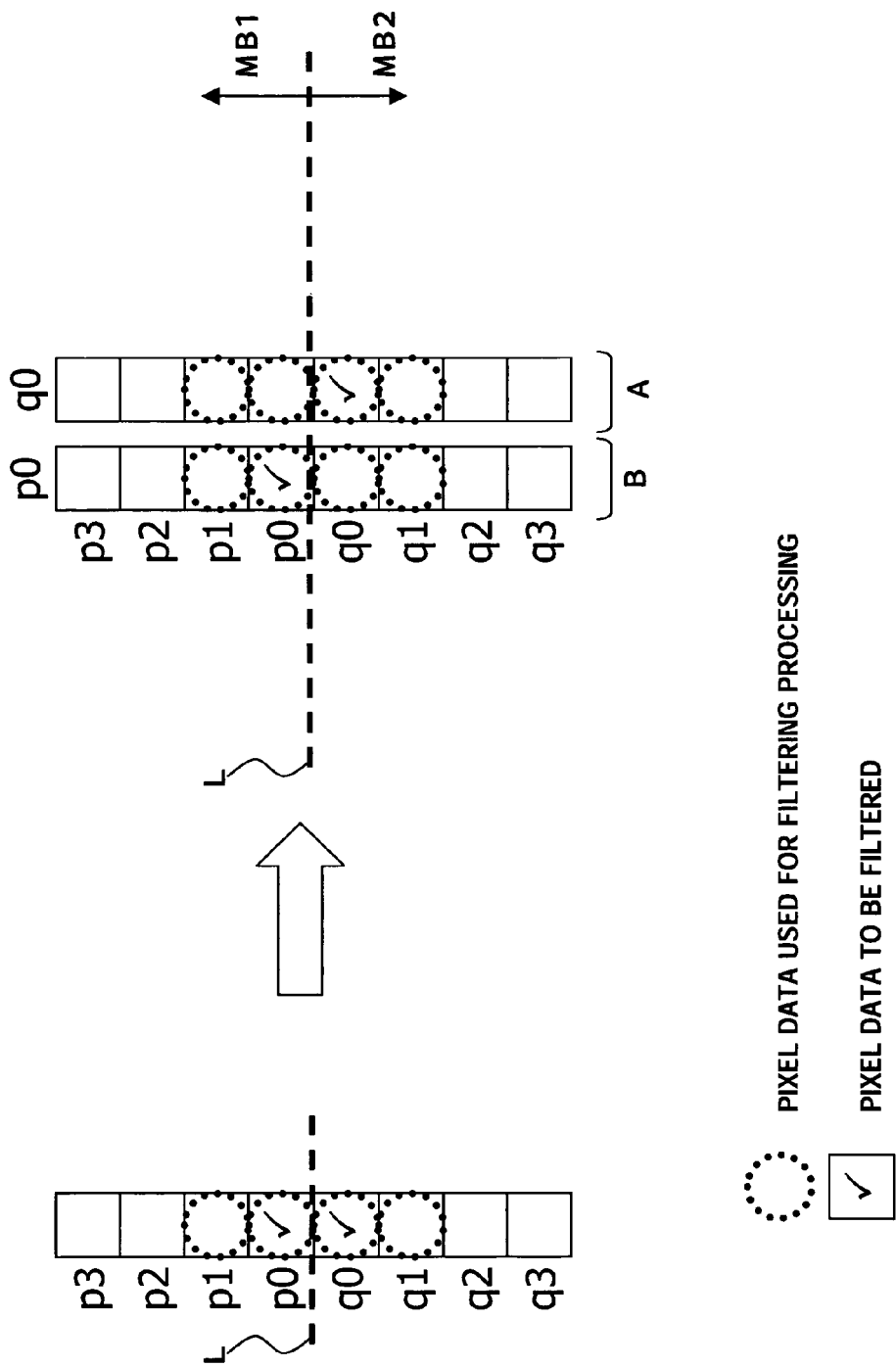
FIG. 9 is a view for explaining filtering processing at a block boundary of the color difference block CB in the deblocking filter shown in FIG. 2.

In the vertical filtering processing VF of a color difference block GB, as shown in FIG. 9, the deblocking filter 34 performs vertical filtering processing VF on pixel data p0 in the macro block MB1 by using two pixel data p0 and p1 in the same column as pixel data p0 in the macro block MB1 and two pixel data q0 and q1 in the same column in an adjacent macro block MB2 below the macro block MB1.

In the vertical filtering processing VF of a color difference block CB, as shown in FIG. 9, the deblocking filter 34 performs vertical filtering processing VF on pixel data q0 in the macro block MB2 by using two pixel data p0 and p1 in the same column as pixel data q0 in the macro block MB1 and two pixel data q0 and q1 in the same column in the macro block MB2.

As explained above, in the vertical filtering processing VF of a color difference block CB, a result of horizontal filtering processing HF of lines p0 and p1 of an adjacent other macro block MB above the macro block MB is used, and pixel data other than that of the lines p0 and p1 of the macro block MB is not used.

As explained above, the horizontal filtering processing HF and the vertical filtering processing of a micro block MB have characteristics below.

As explained by using FIG. 5A and FIG. 8A, in the horizontal filtering processing HF of a luminance block LB and a color difference block CB of a macro block MB, pixel data of adjacent macro block above or below the macro block MB is not used.

Also, as explained by using FIG. 5B, FIG. 6 and FIG. 7, the vertical filtering processing VF of a luminance block LB of the macro block uses a result of the horizontal filtering processing HF of lines p0 and p1 of an adjacent other macro block MB above the macro block MB and does not use pixel data other than that of the lines p0 and p1 of the macro block MB.

Also, as shown in FIG. 5B, pixel data of three lines p0a, p1a and p2a on the lower side in the macro block MB is re-written and newly generated in the vertical filtering processing VF of an adjacent macro block MB below the macro block MB.

Also, as shown in FIG. 9, the vertical filtering processing VF of a color difference block CB uses a result of horizontal filtering processing HF of lines p0 and p1 of an adjacent other macro block MB above the macro block and does not use pixel data other than that of lines p0 and p1 of the other macro block MB.

The followings are drawn from the characteristics above.

When dividing the restructured picture data RPIC shown in FIG. 4 to first block data BPIC1 and second block data BPIC2 by a block boundary line L, by eliminating a dependency relation of processing results of horizontal filtering processing HF and vertical filtering processing VF between a macro block MB adjacent to the block boundary line L in the first block data BPIC1 and a macro block MB adjacent to the block boundary line L in the second block data BPIC2, the horizontal filtering processing HF and the vertical filtering processing VF can be performed in parallel for the first block data BPIC1 and the second block data BPIC2.

Here, from the above characteristics, there are the following dependency relations explained above.

(1) For a luminance block LB and a color difference block CB, as indicated by a mark A in FIG. 6, FIG. 7 and FIG. 9, when performing the vertical filtering processing VF on pixel data of lines q0, q1 and q2 of an adjacent macro block MB2 to a block boundary line L in a block data BPIC2, a horizontal filtering processing result of pixel data on lines p0 and p1 of an adjacent macro block MB1 to the block boundary line L in the block data BPIC1 is necessary.

(2) As to a luminance block LB, as indicated by a mark B in FIG. 6 and FIG. 7, when performing the vertical filtering processing VF on pixel data on lines p0, p1 and p2 of a macro block MB1 being adjacent to the block boundary line L in the block data BPIC1, a vertical filtering processing result of pixel data of lines p1, p2 and p3 of the macro block MB1 and a horizontal filtering processing result of pixel data of lines q0 and q1 of the macro block MB2 are necessary. Note that the vertical filtering processing VF of pixel data of lines p0, p1 and p2 of the macro block MB1 is performed in the vertical filtering processing VF on the adjacent macro block MB2 below the macro block MB1. Also, as to a color difference block CB, as indicated by a mark B in FIG. 9, when performing the vertical filtering processing VF on pixel data on a line p0 of a macro block MB1 being adjacent to the block boundary line L in the block data BPIC1, a horizontal filtering processing result of pixel data of lines q0 and q1 of the macro block MB2 is necessary.

Figure 10:
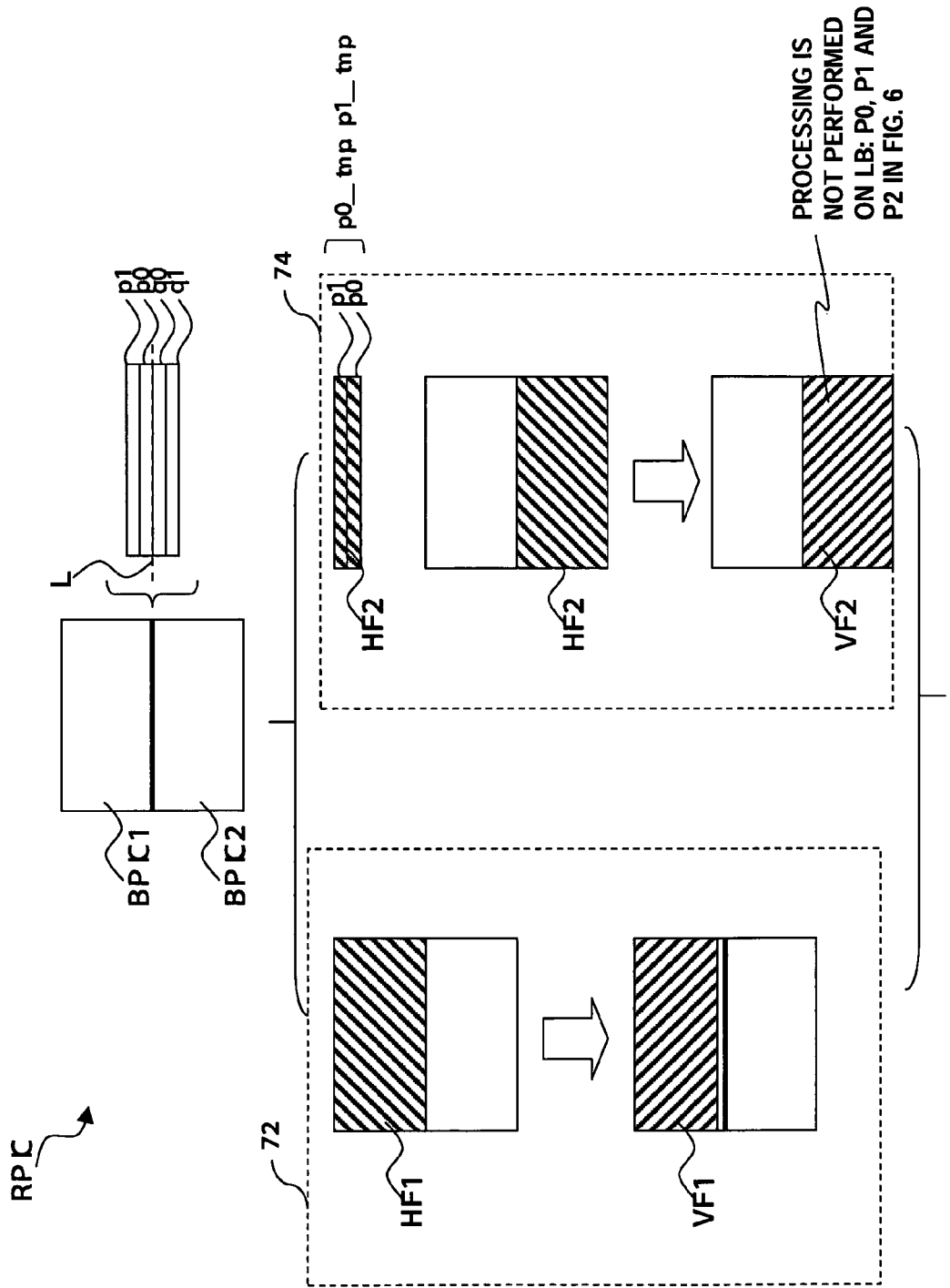
FIG. 10 is a view for explaining processing of the deblocking filter shown in FIG. 3.
Figure 11:
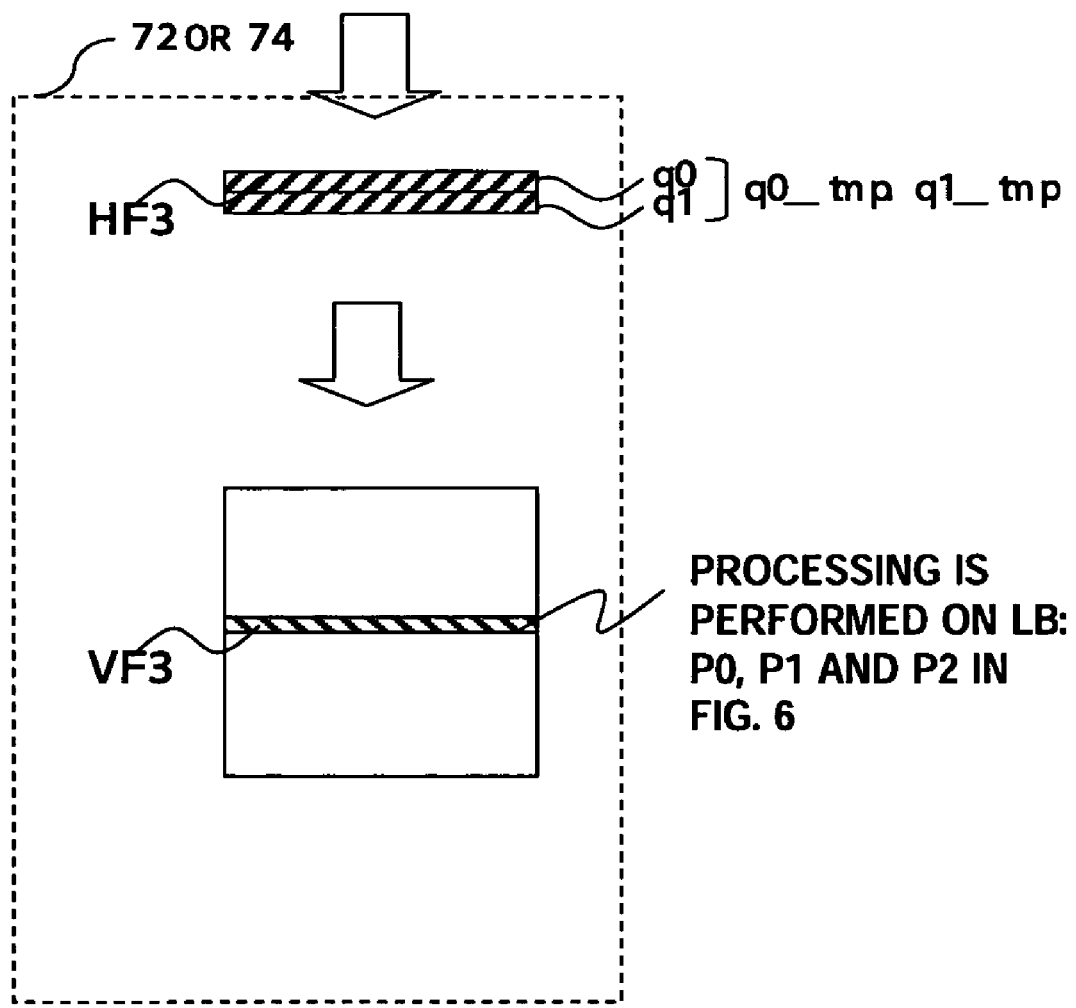
FIG. 11 is a view for explaining processing of the deblocking filter shown in FIG. 3 continued from FIG. 10.
Figure 14:
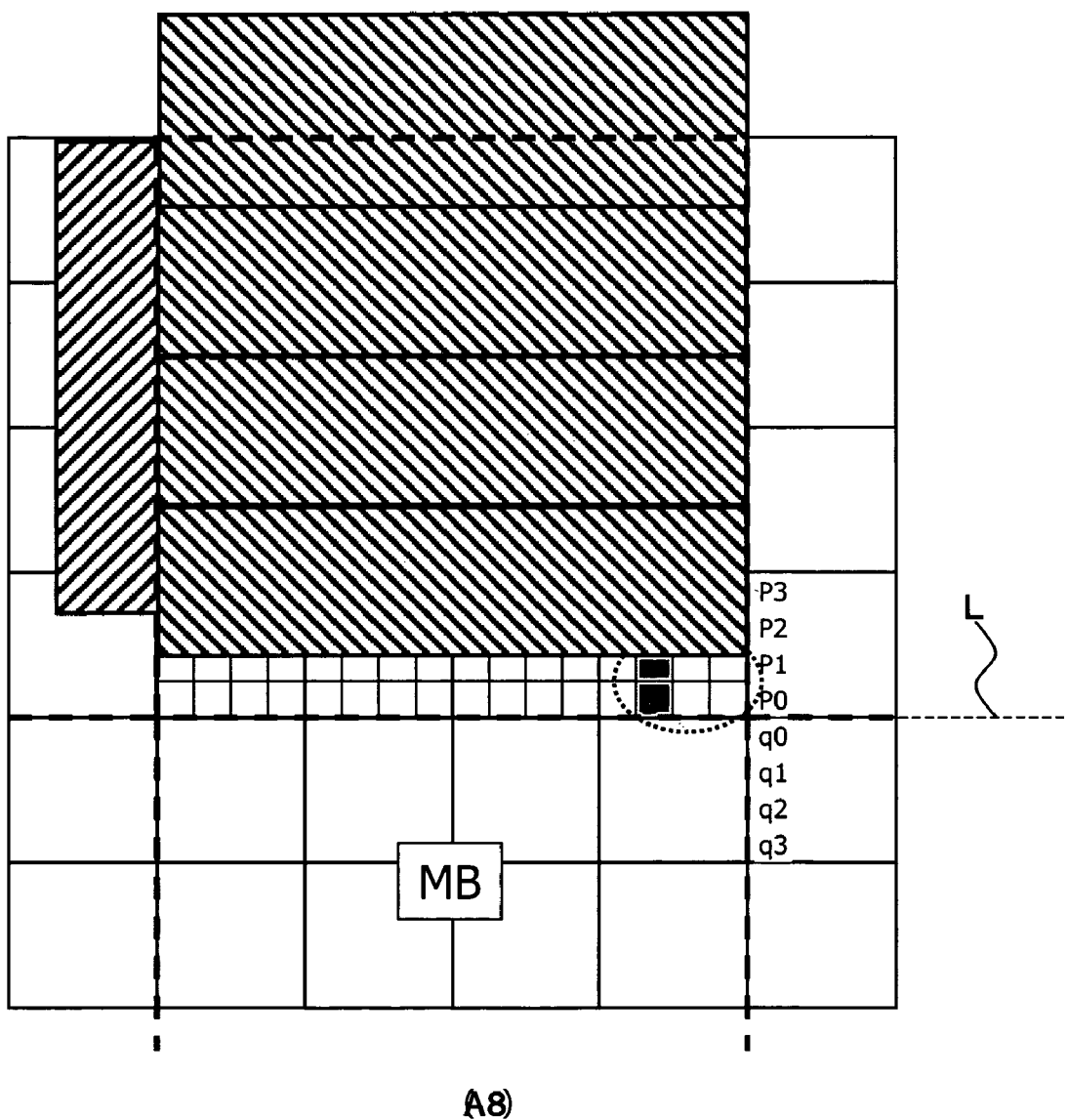
FIG. 14 is a view for explaining filtering processing of the luminance block LB in the filter circuit 72 shown in FIG. 3.

FIG. 10 and FIG. 11 are views for explaining an operation example when performing the horizontal filtering processing HF and the vertical filtering processing VF in parallel in first block data BPIC1 and second block data BPIC2 in the deblocking filter 34 shown in FIG. 3 in consideration of the dependency relation explained above.

First, restructured picture data RPIC from the adding circuit 33 is written to the buffer memory 70.

Then, the filter circuit 72 and the filter circuit 74 read from the buffer memory 70 a luminance block LB and a color difference block CB of an adjacent macro block MB to the block boundary L among macro blocks composing the first block data BPIC1 and second block data BPIC2 composing the restructured picture data RPIC from the buffer memory 70 and perform the processing below.

As shown in FIG. 10, in the deblocking filter 34, in the filter circuit 72, as shown in FIG. 12(A1) to FIG. 12(A4), FIG. 18A and FIG. 18B, horizontal filtering processing HF1 of the first block data BPIC1 not depending on a processing result of the second block data BPIC2 is performed and the result is written to the buffer memory 76.

Also, the filter circuit 72 follows the horizontal filtering processing HF1, as shown in FIG. 13A to FIG. 13(A8), FIG. 14, FIG. 15, FIG. 18A and FIG. 18B, performs vertical filtering processing of pixel data of the first block data BPIC1 not depending on a processing result of the second block data BPIC2, and writes the result to the buffer memory 76.

Then, the filter circuit 72 performs the above processing on the luminance block LB and color difference block CB of all macro blocks MB adjacent to the block boundary L in the first block data BPIC1.

Figure 15:
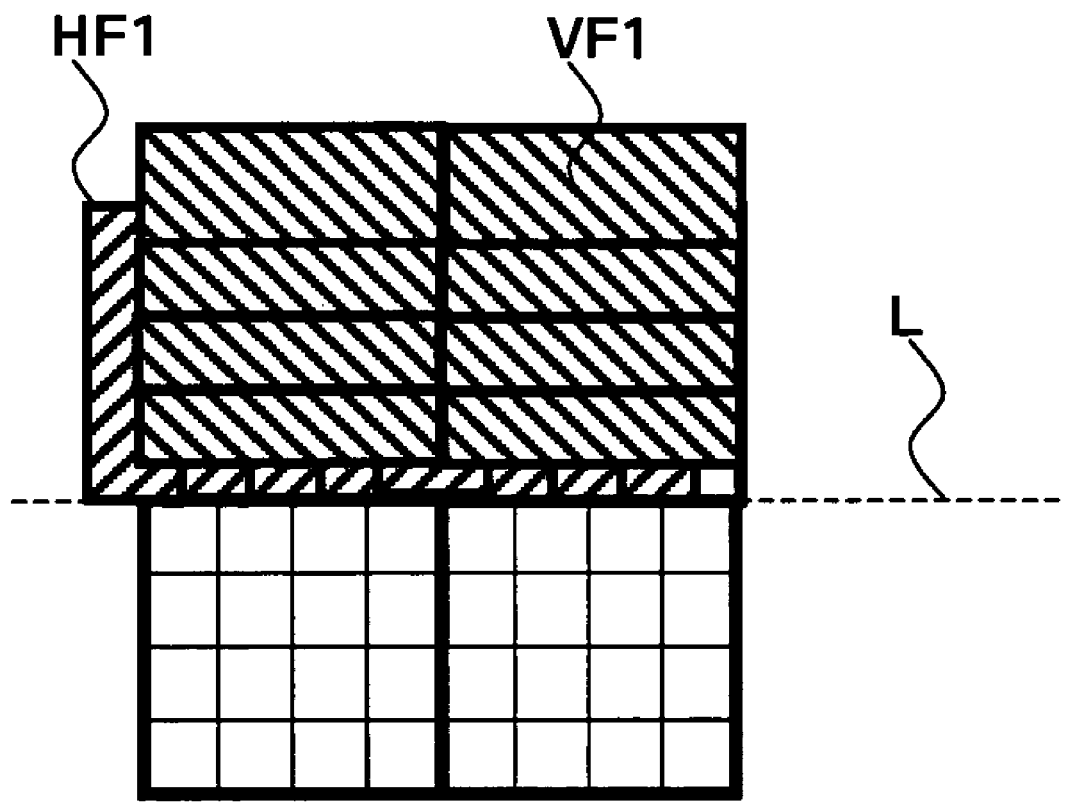
FIG. 15 is a view for explaining filtering processing of the luminance block LB in the filter circuit 72 shown in FIG. 3.
Figure 19:
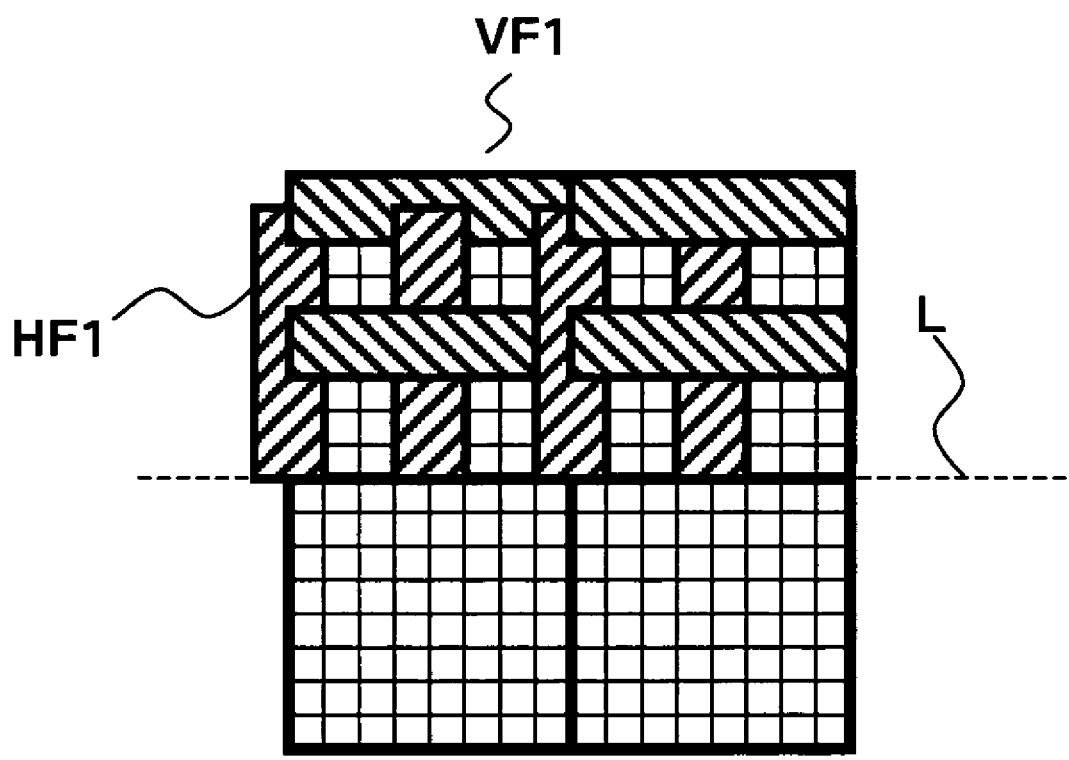
FIG. 19 is a view for explaining filtering processing of the color difference block CB of the filter circuit 72 shown in FIG. 3.

Consequently, the luminance block LB becomes as shown in FIG. 15 and the color difference block CB becomes as shown in FIG. 19.

Also, the filter circuit 72 performs horizontal filtering processing HF and vertical filtering processing VF of macro blocks MB not adjacent to the block boundary line L in the first block data BPIC1.

Also, in the filter circuit 74, as shown in FIG. 16(B1), FIG. 16(B2), FIG. 20(B1) and FIG. 20(B2), the horizontal filtering processing HF2 is performed on the second block data BPIC2 not depending on a processing result of the first block data BPIC1 and writes to the buffer memory 76.

Also, in the filter circuit 74, as shown in FIG. 16(B3), FIG. 20(B1) and FIG. 22, the horizontal filtering processing HF2 is performed on pixel data of lines p0 and p1 of the macro block MB1 in the first block data BPIC1, which are pixel data p0_tmp, p1_tmp buffered in the buffer memory 70, and writes the result to the buffer memory 76.

Continuously, in the filter circuit 74, as shown in FIG. 16(B4), FIG. 17(B5), FIG. 20(B4) and FIG. 21(B2), the vertical filtering processing VF2 is performed on pixel data in the second block data BPIC2 by using the processing results of the horizontal filtering processing HF2 above and writes the result to the buffer memory 76.

At this time, as shown in FIG. 22, vertical filtering processing VF of pixel data of lines q0, q1, q2 and q3 of the macro block MB2 uses the results of the horizontal filtering processing HF2 of the pixel data p0_tmp and p1_tmp as shown in FIG. 22.

In the vertical filtering processing VF2, as shown in FIG. 17(B5) and FIG. 22, vertical filtering processing of pixel data of p0, p1 and p2 in the first block data BPIC1 shown in FIG. 6, etc. is not performed because it depends on results of other vertical filtering processing of the first block data BPIC1 and the results of horizontal filtering processing of pixel data of lines q0 and q1 of the macro block MB2. Also, vertical filtering processing of pixel data of a line p0 in the first block data BPIC1 shown in FIG. 9 is not performed because it depends on the result of the horizontal filtering processing of lines q0 and q1 of the macro block MB2.

The filter circuit 74 performs the above processing on luminance blocks LB and color difference blocks CB of all macro blocks MB adjacent to the block boundary L in the second block data BPIC2.

Also, the filter circuit 74 performs the horizontal filtering processing HF and vertical filtering processing VF on macro blocks not adjacent to the block boundary L of the second block data BPIC2.

The processing in the filter circuit 72 and that in the filter circuit 74 explained above are performed in parallel.

Next, in the filter circuit 72 or filter circuit 74, as shown in FIG. 21(C1), FIG. 21(C2) and FIG. 23, horizontal filtering processing HF3 is performed on pixel data of lines q0 and q1 of the macro block MB2 in the second block data BPIC2, which is the pixel data q0_tmp and q1_tmp buffered in the buffer memory 70, and the results is written to the buffer memory 76.

Continuously, in the filter circuit 72 or filter circuit 74, as shown in FIG. 21(C2), FIG. 21(C2) and FIG. 23, the processing results of the vertical filtering processing VF2 and the horizontal filtering processing HF3 are used for performing vertical filtering processing VF3 on pixel data of lines p0, p1 and p2 of the first block data BPIC1 shown in FIG. 6, etc. and the results are written to the buffer memory 76.

The filter circuit 72 or the filter circuit 74 performs the above processing on the macro blocks MB adjacent to the block boundary L1 of the first block data BPIC1 and the second block data BPIC2 by using a macro block of the first block data BPIC1 as a macro block MB1 and using a macro block of the second block data BPIC2 as a macro block MB2.

Below, an overall operation of the encoding apparatus 2 shown in FIG. 2 will be explained.

An image signal to be an input is converted to a digital signal by the A/D conversion circuit 22.

Next, in accordance with a GOP configuration of image compression information to be an output, frame image data is relocated by the screen relocating circuit 23, and original image data S23 obtained thereby is output to the computing circuit 24, the motion prediction compensation circuit 42 and the intra-prediction circuit 41.

Next, the computing circuit 24 detects a difference of the original image data S23 from the screen relocating circuit 23 and prediction image data PI from the selection circuit 44 and outputs image data S24 indicating the difference is output to the orthogonal transformation circuit 25.

Next, the orthogonal transformation circuit 25 performs discrete cosine transformation, Karhunen-Loeve transformation or other orthogonal transformation on the image data S24 to generate image data (a DCT coefficient) S25 and outputs the same to the quantization circuit 26.

Next, the quantization circuit 26 quantizes the image data S25 and outputs image data (quantized DCT coefficient) S26 to the reversible encoding circuit 27 and the inverse quantization circuit 29.

Then, the reversible encoding circuit 27 performs reverse encoding of variable encoding or arithmetic encoding on the image data S26 to generate image data S28 and accumulates the same in the buffer 28.

Also, the rate control circuit 32 controls a quantization rate in the quantization circuit 26 based on the image data 28 read from the buffer 28.

Also, the inverse quantization circuit 29 performs inverse quantization on the image data S26 input from the quantization circuit 26 and outputs the result to the inverse orthogonal transformation circuit 30.

Then, the inverse orthogonal transformation circuit 30 performs inverse transformation of the transformation processing by the orthogonal transformation circuit 25 to generate image data and outputs the same to the adding circuit 33.

In the adding circuit 33, the image data from the inverse transformation circuit 30 is added to the prediction image data PI from the selection circuit 44 to generate restructured image data and the result is output to the deblocking filter 34.

In the deblocking filter 34, through the processing explained above, image data obtained by removing block distortions of the restructured image data is generated and written to the frame memory 31 as reference image data.

In the intra-prediction circuit 41, the intra-prediction processing explained above is performed and the result prediction image data PIi and index data COSTi are output to the selection circuit 44.

Also, in the motion prediction compensation circuit 42, a motion vector is generated by using reference picture data R_PIC and the result prediction image data PIm and index data COSTm are output to the selection circuit.

Then, in the selection circuit 44, the smaller one is specified from the index data COSTm input from the motion prediction compensation circuit 42 and the index data COSTi input from the intra prediction circuit 41, and the prediction image data PIm or PIi input in accordance with the specified index data is output to the computing circuit 24 and the adding circuit 33.

Accordingly, as explained by using FIG. 10 and FIG. 11, etc., in the encoding apparatus 2, deblock filtering processing is performed in parallel by the filter circuits 72 and 74 shown in FIG. 3. Therefore, the processing time for the deblocking filtering processing can be largely reduced comparing with that in the case of not performing parallel processing as in the related art.

In an encoding apparatus of the related art, time required by deblocking filtering processing constituted a large portion, so that the processing tine of the entire encoding processing can be largely reduced according to the encoding apparatus 2.

The present invention is not limited to the above embodiment.

In the embodiment explained above, deblock filtering processing was explained as an example of predetermined processing of the present invention, however, in the present invention, processing to be performed on element data in the first block includes first processing not using element data after subjected to predetermined processing in the second block and second processing using first element data as a part of the element data after subjected to the predetermined processing in the second block; and it may be applied to other processing, wherein processing on the element data in the second block includes third processing not using the element data after subjected to the predetermined processing in the first block and fourth processing using second element data as a part of the element data after subjected to the predetermined processing in the first block.

Also, when a deblocking filter is included in the decoding apparatus corresponding to the encoding apparatus 2, the present invention can be also applied thereto.

Also, the deblocking filter 34 shown in FIG. 3 as explained above may be configured, so that a CPU (central processing unit), etc. executes a program for defining the processing explained by using FIG. 10 and FIG. 11, etc.

The present invention can be applied to a system, wherein processing is performed in units of block data by using a processing result of other block data.

It should be understood by those skilled in the art that various modifications, combinations, sub-combinations and alternations may occur depending on design requirements and other factors insofar as they are within the scope of the appended claims or the equivalents thereof.

What is claimed is:

1. An image processing apparatus for performing processing on a first block for defining a first two-dimensional image and on a second block for defining a second two-dimensional image adjacent to the first two-dimensional image, comprising:
   a first processing means for performing:
      horizontal filtering processing on first pixel data in the first block, and
      vertical filtering processing on second pixel data in the first block;
   a second processing means for performing:
      horizontal filtering processing on third pixel data in the first block,
      horizontal filtering processing on fourth pixel data in the second block,
      vertical filtering processing on fifth pixel data in the second block using the third pixel data in the first block after the horizontal filtering processing on the third pixel data in the first block, and
      vertical filtering processing on sixth pixel data in the second block by using the fourth pixel data in the second block after the horizontal filtering processing on the fourth pixel data in the second block,
      wherein the second processing means and the first processing means process in parallel; and
   a third processing means for performing:
      horizontal filtering processing on the fifth pixel data in the second block, and
      vertical filtering processing on the first pixel data of the first block using the fifth pixel data in the second block after the horizontal filtering processing on the fifth pixel data in the second block and the vertical filtering processing by the first processing means.

2. An image processing apparatus as set forth in claim 1, further comprising:
   a memory for storing the third pixel data in the first block before the horizontal filtering processing on the third pixel data in the first block and for storing the fifth pixel data in the second block before the horizontal filtering processing on the fifth pixel data in the second block;
   wherein the second processing means performs the vertical filtering processing by reading the third pixel data in the first block pixel data from the memory; and
   wherein the third processing means performs the horizontal filtering processing by reading the fifth pixel data in the second block from the memory.

3. An image processing apparatus as set forth in claim 1, further comprising:
   a motion prediction compensation means for generating prediction image data of image data to be encoded by performing motion vector searching in reference image data;
   an orthogonal transformation quantization means for performing orthogonal transformation processing and quantization processing on a difference of the prediction image data and the image data to be encoded and generating orthogonal image data;
   an inverse orthogonal transformation quantization means for performing inverse quantization processing and inverse orthogonal transformation processing on the orthogonal image data and generating inverse orthogonal image data; and
   a restructuring means for generating restructured image data by using prediction image data and the inverse orthogonal image data;
   wherein the first processing means, the second processing means, and the third processing means perform horizontal filtering processing and vertical filtering processing on the first block and the second block in the restructured image data and generate the reference image data based on the results.

4. An image processing method performed by a data processing apparatus, comprising a memory a first processing means, and a second processing means, for performing processing on a first block for defining a first two-dimensional image and a second block for defining a second two-dimensional image adjacent to the first two-dimensional image, the method comprising:
   performing, by the first processing means, horizontal filtering processing on first pixel data in the first block and vertical filtering processing on second pixel data in the first block; and
   performing, by the second processing means, horizontal filtering processing on third pixel data in the first block, horizontal filtering processing on fourth pixel data in the second block, vertical filtering processing on fifth pixel data in the second block by using the third pixel data in the first block after the horizontal filtering processing on the third pixel data in the first block, and vertical filtering processing on sixth pixel data in the second block using the fourth pixel data in the second block after the horizontal filtering processing on the fourth pixel data in the second block,
   wherein the first processing means and the second processing means process in parallel; and
   performing horizontal filtering processing on the fifth pixel data in the second block, and vertical filtering processing on the first pixel data of the first block using the fifth pixel data in the second block after the horizontal filtering processing on the fifth pixel data in the second block and processing results of the vertical filtering processing on the fifth pixel data in the second block.

5. A method comprising:
   a first step for performing horizontal filtering processing on first pixel data in a first block and vertical filtering processing on second pixel data in the first block; and
   a second step for performing horizontal filtering processing on third pixel data in the first block, horizontal filtering processing on fourth pixel data in a second block, vertical filtering processing on fifth pixel data in the second block by using the third pixel data in the first block after the horizontal filtering processing on the third pixel data in the first block, and vertical filtering processing on sixth pixel data in the second block using the fourth pixel data in the second block after the horizontal filtering processing on the fourth pixel data in the second block,
   wherein the first step and the second step process in parallel; and
   a third step for performing horizontal filtering processing on the fifth pixel data in the second block, and vertical filtering processing on the first pixel data of the first block using the fifth pixel data in the second block after the horizontal filtering processing on the fifth pixel data in the second block and processing results of the vertical filtering processing on the fifth pixel data in the second block.

* * * * *

UNITED STATES PATENT AND TRADEMARK OFFICE
CERTIFICATE OF CORRECTION

PATENT NO. : 7,715,647 B2
APPLICATION NO. : 11/300310
DATED : May 11, 2010
INVENTOR(S) : Hiroshi Kajihata It is certified that error appears in the above-identified patent and that said Letters Patent is hereby corrected as shown below:

In claim 4, column 20, line 11, "a memory a first processing" should read --a memory, a first processing--.

Signed and Sealed this

Third Day of August, 2010

David J. Kappos
*Director of the United States Patent and Trademark Office*